US010774769B2

(12) United States Patent
Kuroda et al.

(10) Patent No.: US 10,774,769 B2
(45) Date of Patent: Sep. 15, 2020

(54) CONTROLLER FOR INTERNAL COMBUSTION ENGINE AND METHOD FOR CONTROLLING INTERNAL COMBUSTION ENGINE

(71) Applicant: TOYOTA JIDOSHA KABUSHIKI KAISHA, Toyota-shi, Aichi-ken (JP)

(72) Inventors: Ryusuke Kuroda, Nagoya (JP); Masanao Idogawa, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/521,725

(22) Filed: Jul. 25, 2019

(65) Prior Publication Data
US 2020/0049090 A1    Feb. 13, 2020

(30) Foreign Application Priority Data

Aug. 7, 2018    (JP) ................. 2018-148051

(51) Int. Cl.
| | | |
|---|---|---|
| *B60T 7/12* | (2006.01) | |
| *F02D 41/14* | (2006.01) | |
| *F02D 37/02* | (2006.01) | |
| *F02D 41/02* | (2006.01) | |
| *F02D 41/00* | (2006.01) | |

(Continued)

(52) U.S. Cl.
CPC ......... *F02D 41/1475* (2013.01); *F01N 3/101* (2013.01); *F02D 37/02* (2013.01); *F02D 41/0002* (2013.01); *F02D 41/0087* (2013.01); *F02D 41/025* (2013.01); *F02D 41/0295* (2013.01); *F02D 41/1441* (2013.01); *F02D 41/1454* (2013.01); *F02D 41/30* (2013.01); *F02D 2041/3088* (2013.01)

(58) Field of Classification Search
CPC ............ F02D 41/0085; F02D 41/1439; F02D 41/1441; F02D 41/1458; F02D 41/1498; F02D 41/1463; F02D 41/1465; F02D 2200/0814; F02D 2200/0816
USPC ........ 701/101, 103–105, 109, 110, 112, 114, 701/115; 123/435, 673; 60/274, 276, 60/277, 285
See application file for complete search history.

(56) References Cited

U.S. PATENT DOCUMENTS

| | | | |
|---|---|---|---|
| 2009/0093943 A1* | 4/2009 | Hirowatari .......... | F02D 41/3836 701/103 |
| 2011/0192144 A1* | 8/2011 | Yasui .................. | F02D 41/0275 60/276 |

(Continued)

FOREIGN PATENT DOCUMENTS

JP        2014-66154 A        4/2014

*Primary Examiner* — John Kwon
(74) *Attorney, Agent, or Firm* — Oliff PLC

(57) ABSTRACT

A controller for an internal combustion engine of a spark ignition type is provided. When stopping combustion in a cylinder in a situation in which a crankshaft of the internal combustion engine is rotating, one of a fuel cut process and a fuel feeding process is selectively executed. When combustion is resumed in the cylinder in which the combustion has been stopped, an enrichment process is executed to control a fuel injection valve so that an air-fuel ratio is set to be richer than a stoichiometric air-fuel ratio. When the enrichment process is executed, a decrease amount of an oxygen storage amount of the three-way catalyst corresponding to the enrichment process is set.

14 Claims, 9 Drawing Sheets

(51) Int. Cl.
*F01N 3/10* (2006.01)
*F02D 41/30* (2006.01)

(56) References Cited

U.S. PATENT DOCUMENTS

| | | | |
|---|---|---|---|
| 2013/0006506 A1* | 1/2013 | Takada | F02D 41/0085 |
| | | | 701/108 |
| 2013/0179051 A1* | 7/2013 | Tomimatsu | F02D 41/0235 |
| | | | 701/104 |
| 2014/0041362 A1 | 2/2014 | Ulrey et al. | |
| 2014/0331973 A1* | 11/2014 | Matsuda | F02D 13/0207 |
| | | | 123/478 |
| 2020/0102901 A1* | 4/2020 | Imai | F01N 11/002 |

* cited by examiner

CONTROLLER FOR INTERNAL COMBUSTION ENGINE AND METHOD FOR CONTROLLING INTERNAL COMBUSTION ENGINE

BACKGROUND

1. Field

The present disclosure relates to a controller for an internal combustion engine and method for controlling an internal combustion engine.

2. Description of Related Art

U.S. Patent Application Publication No. 2014/0041362 describes an example of an internal combustion engine that uses gasoline as fuel. An exhaust gas purifying device of the internal combustion engine includes a three-way catalyst provided in an exhaust passage and a particulate filter disposed downstream of the three-way catalyst in the exhaust passage.

In the internal combustion engine described in the above document, when a request torque of the internal combustion engine is decreased due to, for example, cancellation of an accelerator operation, and a small load is applied to the internal combustion engine, combustion in a cylinder may be stopped. During such a combustion stoppage period, one of a fuel cut process that stops fuel injection of a fuel injection valve and a fuel feeding process is selectively executed. The fuel feeding process injects fuel from the fuel injection valve and discharges the fuel in an unburned state from the cylinder into the exhaust passage. According to the above publication, the fuel feeding process is executed when regenerating the particulate filter. When the regeneration is not performed, the fuel cut process is executed.

In the fuel feeding process, the fuel injected from the fuel injection valve flows through the exhaust passage with air. When the fuel is drawn into the three-way catalyst, the fuel burns and the temperature of the three-way catalyst increases. This allows a high temperature gas to flow into the particulate filter and increases the temperature of the particulate filter. As a result, particulate matter captured in the particulate filter is burned.

During the combustion stoppage period, air drawn from an intake passage into the cylinder flows out to the exhaust passage without being burned, and thus the oxygen storage amount of the three-way catalyst increases as compared to when combustion is performed in the cylinder. In this regard, for example, as described in Japanese Laid-Open Patent Publication No. 2014-66154, when the combustion stoppage period ends and combustion is resumed in the cylinder, an enrichment process is executed to control the air-fuel ratio to be richer than a stoichiometric air-fuel ratio so that the oxygen storage amount of the three-way catalyst is decreased to a proper amount.

When the fuel feeding process is executed during the combustion stoppage period, the oxygen storage amount of the three-way catalyst at a point in time when combustion is resumed in the cylinder may differ from when the fuel feeding process is not executed during the combustion stoppage period. More specifically, when the fuel feeding process is executed during the combustion stoppage period, the unburned fuel is burned in the three-way catalyst, consuming oxygen existing in the three-way catalyst. As a result, when the fuel feeding process is executed during the combustion stoppage period, the oxygen storage amount of the three-way catalyst at the point in time when combustion is resumed in the cylinder may not be increased as compared with when the fuel feeding process is not executed during the combustion stoppage period.

Thus, when the fuel feeding process is executed during the combustion stoppage period and combustion is resumed in the cylinder, if the enrichment process is executed in the same manner as when the fuel feeding process is not executed during the combustion stoppage period, the oxygen storage amount of the three-way catalyst may be less than the proper amount.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

An aspect of the present disclosure provides a controller for an internal combustion engine of a spark ignition type. The internal combustion engine includes a fuel injection valve configured to inject fuel and a three-way catalyst provided in an exhaust passage. The internal combustion engine is configured to burn an air-fuel mixture containing fuel injected from the fuel injection valve in a cylinder. When stopping combustion in the cylinder in a situation in which a crankshaft of the internal combustion engine is rotating, the controller is configured to selectively execute one of a fuel cut process and a fuel feeding process. The fuel cut process includes stopping fuel injection of the fuel injection valve. The fuel feeding process includes injecting fuel from the fuel injection valve and discharging the fuel in an unburned state from the cylinder to the exhaust passage. The controller includes an injection valve control unit. The injection valve control unit is configured to execute an enrichment process that controls the fuel injection valve when combustion is resumed in the cylinder in which the combustion has been stopped, so that an air-fuel ratio is set to be richer than a stoichiometric air-fuel ratio. When executing the enrichment process, the injection valve control unit is configured to set a decrease amount of an oxygen storage amount of the three-way catalyst corresponding to the enrichment process.

The oxygen storage amount of the three-way catalyst at a time of resuming combustion in the cylinder may change depending on the length of the combustion stoppage period of the cylinder and whether or not the fuel feeding process is executed during the stop period. Thus, in the configuration described above, when executing the enrichment process, the decrease amount of the oxygen storage amount of the three-way catalyst corresponding to the enrichment process is set. The oxygen storage amount of the three-way catalyst at a point in time when combustion is resumed in the cylinder is referred to as resumption oxygen storage amount. According to the above configuration, the enrichment process is executed in accordance with the resumption oxygen storage amount. This limits deviation of the oxygen storage amount of the three-way catalyst from the proper amount, which would otherwise be caused by execution of the enrichment process.

An aspect of the present disclosure provides a controller for an internal combustion engine of a spark ignition type. The internal combustion engine includes a fuel injection valve configured to inject fuel and a three-way catalyst provided in an exhaust passage. The internal combustion engine is configured to burn an air-fuel mixture containing fuel injected from the fuel injection valve in a cylinder. When stopping combustion in the cylinder in a situation in which a crankshaft of the internal combustion engine is rotating, the controller is configured to selectively execute one of a fuel cut process and a fuel feeding process. The fuel cut process includes stopping fuel injection of the fuel injection valve. The fuel feeding process includes injecting fuel from the fuel injection valve and discharging the fuel in an unburned state from the cylinder to the exhaust passage. The controller includes an injection valve control unit. When combustion is resumed in the cylinder in which the combustion has been stopped, the injection valve control unit is configured to execute an enrichment process that controls the fuel injection valve so that an air-fuel ratio is set to be richer than a stoichiometric air-fuel ratio. when resuming combustion in the cylinder in which the combustion has been stopped, the injection valve control unit is configured to execute the enrichment process so that in a case in which the fuel feeding process is executed in a period during which combustion is stopped in the cylinder, a decrease amount of the oxygen storage amount of the three-way catalyst is less than in a case in which the fuel feeding process is not executed in the period during which combustion is stopped in the cylinder.

When the fuel feeding process is executed during the combustion stoppage period of the cylinder, the resumption oxygen storage amount tends to be less than when the fuel feeding process is not executed during the combustion stoppage period of the cylinder. In this respect, in the above configuration, when combustion is resumed in the cylinder in which the combustion has been stopped, the injection valve control unit may be configured to execute the enrichment process so that in a case in which the fuel feeding process is executed during the combustion stoppage period of the cylinder, a decrease amount of the oxygen storage amount of the three-way catalyst is less than in a case in which the fuel feeding process is not executed during the combustion stoppage period of the cylinder. Thus, even when the fuel feeding process is executed during the combustion stoppage period of the cylinder, at the time of resuming the combustion in the cylinder, the enrichment process is executed in accordance with the resumption oxygen storage amount. This limits deviation of the oxygen storage amount of the three-way catalyst from the proper amount, which would otherwise be caused by execution of the enrichment process.

The controller for an internal combustion engine may include a storage amount calculator configured to calculate an estimated value of the oxygen storage amount of the three-way catalyst.

During the execution of the fuel feeding process, the fuel injected from the fuel injection valve is drawn into the three-way catalyst in an unburned state, and the fuel is burned in the three-way catalyst. At this time, oxygen existing in the three-way catalyst is consumed. Thus, the oxygen storage amount of the three-way catalyst may not be increased as compared to during the execution of the fuel cut process. Thus, the storage amount calculator may be configured to calculate the estimated value of the oxygen storage amount so that during execution of the fuel feeding process, an increase rate of the oxygen storage amount of the three-way catalyst is lower than during execution of the fuel cut process.

When the controller for an internal combustion engine includes such a storage amount calculator, the enrichment process may include a first enrichment process and a second enrichment process so that when the second enrichment process is executed, the decrease amount of the oxygen storage amount of the three-way catalyst is less than when the first enrichment process is executed. The injection valve control unit may be configured to selectively execute one of the first enrichment process and the second enrichment process.

Thus, during the execution of the fuel feeding process, the oxygen storage amount of the three-way catalyst is increased more gradually than during the execution of the fuel cut process. More specifically, the oxygen storage amount of the three-way catalyst is increased even during the execution of the fuel feeding process. Thus, even when the fuel feeding process is executed during the combustion stoppage period of the cylinder, the oxygen storage amount of the three-way catalyst may reach the maximum value of the oxygen storage amount during the stop period.

The injection valve control unit may be configured to execute the second enrichment process when combustion is resumed in the cylinder and the estimated value of the oxygen storage amount at a point in time when the combustion is resumed in the cylinder is less than the maximum value of the oxygen storage amount of the three-way catalyst. The injection valve control unit may be configured to execute the first enrichment process when combustion is resumed in the cylinder and the estimated value of the oxygen storage amount at a point in time when the combustion is resumed in the cylinder is the maximum value of the oxygen storage amount of the three-way catalyst.

According to the configuration described above, even when the fuel feeding process is executed during the combustion stoppage period of the cylinder, the second enrichment process is not executed and the first enrichment process is executed when the oxygen storage amount of the three-way catalyst is maximum at a point in time when combustion is resumed in the cylinder. Thus, the execution of the enrichment process decreases the oxygen storage amount of the three-way catalyst to the proper amount.

The controller may include a storage amount calculator configured to calculate an estimated value of the oxygen storage amount of the three-way catalyst. The storage amount calculator may be configured to calculate the estimated value of the oxygen storage amount so that during execution of the fuel feeding process, an increase rate of the oxygen storage amount of the three-way catalyst is lower than during execution of the fuel cut process. When resuming combustion in the cylinder, the injection valve control unit may be configured to execute the enrichment process so that in a case in which the estimated value of the oxygen storage amount at a point in time when combustion is resumed in the cylinder is small, the decrease amount of the oxygen storage amount of the three-way catalyst is less than in a case in which the estimated value of the oxygen storage amount at a point in time when the combustion is resumed is large.

Even when the fuel feeding process is not executed during the combustion stoppage period of the cylinder, the resumption oxygen storage amount may not be increased so much, for example, if the stop period is short. Even when the fuel feeding process is executed during the combustion stoppage period of the cylinder, the resumption oxygen storage amount may be increased, for example, if the fuel feeding process is executed for a long period of time. In this respect, according to the configuration described above, the decrease amount of the oxygen storage amount of the three-way catalyst corresponding to the enrichment process is set according to the resumption oxygen storage amount regardless of whether or not the fuel feeding process is executed during the combustion stoppage period of the cylinder. This limits deviation of the oxygen storage amount of the three-way catalyst from the proper amount, which would otherwise be caused by execution of the enrichment process.

During the combustion stoppage period of the cylinder, as the amount of air flowing through the exhaust passage increases, the oxygen storage amount of the three-way catalyst tends to increase. Thus, the storage amount calculator may be configured to calculate the estimated value of the oxygen storage amount during the execution of the fuel cut process so that the increase rate of the oxygen storage amount of the three-way catalyst increases as the flow rate of gas in the exhaust passage increases.

During the execution of the fuel feeding process, the fuel drawn into the three-way catalyst is burned in the three-way catalyst. At this time, as the amount of fuel increases, a greater amount of oxygen tends to be consumed. Thus, the storage amount calculator may be configured to calculate the estimated value of the oxygen storage amount during the execution of the fuel feeding process so that the increase rate of the oxygen storage amount of the three-way catalyst becomes higher as the flow rate of gas in the exhaust passage increases and so that the increase rate becomes lower as the fuel injection amount of the fuel injection valve increases.

The decrease amount of the oxygen storage amount of the three-way catalyst corresponding to the enrichment process depends on the length of the execution period of the enrichment process and the air-fuel ratio during the execution of the enrichment process. More specifically, as the execution period of the enrichment process shortens, a period during which the air-fuel ratio is richer than the stoichiometric air-fuel ratio shortens. This decreases the decrease amount of the oxygen storage amount of the three-way catalyst corresponding to the enrichment process. Additionally, when the air-fuel ratio is richer than the stoichiometric air-fuel ratio, as the air-fuel ratio becomes closer to the stoichiometric air-fuel ratio, the decrease rate of the oxygen storage amount of the three-way catalyst lowers during the execution of the enrichment process. More specifically, as the air-fuel ratio becomes closer to the stoichiometric air-fuel ratio, the decrease amount of the oxygen storage amount of the three-way catalyst corresponding to the enrichment process decreases.

The injection valve control unit may be configured to set the decrease amount of the oxygen storage amount of the three-way catalyst in the enrichment process, for example, through setting of the length of the execution period of the enrichment process. When executing the enrichment process in such a manner, the length of the execution period of the enrichment process is set. The execution of the enrichment process decreases the oxygen storage amount of the three-way catalyst to a proper amount.

The injection valve control unit may be configured to set the decrease amount of the oxygen storage amount of the three-way catalyst in the enrichment process, for example, through setting of the air-fuel ratio during the execution of the enrichment process. When executing the enrichment process in such a manner, the air-fuel ratio during the execution of the enrichment process is set. Thus, the execution of the enrichment process decreases the oxygen storage amount of the three-way catalyst to a proper amount.

An aspect of the present disclosure provides a method for controlling an internal combustion engine of a spark ignition type. The internal combustion engine includes a fuel injection valve configured to inject fuel and a three-way catalyst provided in an exhaust passage. The internal combustion engine is configured to burn an air-fuel mixture containing fuel injected from the fuel injection valve in a cylinder. The method includes selectively executing one of a fuel cut process and a fuel feeding process when stopping combustion in the cylinder in a situation in which a crankshaft of the internal combustion engine is rotating, the fuel cut process including stopping fuel injection of the fuel injection valve, and the fuel feeding process including injecting fuel from the fuel injection valve and discharging the fuel in an unburned state from the cylinder to the exhaust passage; executing an enrichment process that controls the fuel injection valve when combustion is resumed in the cylinder in which the combustion has been stopped, so that an air-fuel ratio is set to be richer than a stoichiometric air-fuel ratio; and setting a decrease amount of an oxygen storage amount of the three-way catalyst corresponding to the enrichment process when executing the enrichment process.

An aspect of the present disclosure provides a controller for an internal combustion engine of a spark ignition type. The internal combustion engine includes a fuel injection valve configured to inject fuel and a three-way catalyst provided in an exhaust passage. The internal combustion engine is configured to burn an air-fuel mixture containing fuel injected from the fuel injection valve in a cylinder. The controller includes circuitry. The circuitry is configured to perform selectively executing one of a fuel cut process and a fuel feeding process when stopping combustion in the cylinder in a situation in which a crankshaft of the internal combustion engine is rotating, the fuel cut process including stopping fuel injection of the fuel injection valve, and the fuel feeding process including injecting fuel from the fuel injection valve and discharging the fuel in an unburned state from the cylinder to the exhaust passage, executing an enrichment process that controls the fuel injection valve when combustion is resumed in the cylinder in which the combustion has been stopped, so that an air-fuel ratio is set to be richer than a stoichiometric air-fuel ratio, and setting a decrease amount of an oxygen storage amount of the three-way catalyst corresponding to the enrichment process when executing the enrichment process.

An aspect of the present disclosure provides a controller for an internal combustion engine of a spark ignition type. The internal combustion engine includes a fuel injection valve configured to inject fuel and a three-way catalyst provided in an exhaust passage. The internal combustion engine is configured to burn an air-fuel mixture containing fuel injected from the fuel injection valve in a cylinder. The controller includes circuitry. The circuitry is configured to perform selectively executing one of a fuel cut process and a fuel feeding process when stopping combustion in the cylinder in a situation in which a crankshaft of the internal combustion engine is rotating, the fuel cut process including stopping fuel injection of the fuel injection valve, and the fuel feeding process including injecting fuel from the fuel injection valve and discharging the fuel in an unburned state from the cylinder to the exhaust passage; executing an enrichment process that controls the fuel injection valve when combustion is resumed in the cylinder in which the combustion has been stopped, so that an air-fuel ratio is set to be richer than a stoichiometric air-fuel ratio; and executing the enrichment process when resuming combustion in the cylinder in which the combustion has been stopped, so that in a case in which the fuel feeding process is executed in a period during which combustion is stopped in the cylinder, a decrease amount of an oxygen storage amount of the three-way catalyst is less than in a case in which the fuel feeding process is not executed in the period during which combustion is stopped in the cylinder.

Other features and aspects will be apparent from the following detailed description, the drawings, and the claims.

BRIEF DESCRIPTION OF THE DRAWINGS

Throughout the drawings and the detailed description, the same reference characters refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

When an element is referred to as being "on" or "connected to" another element, it includes cases where the element is directly "on" or "connected to" the other element and cases where the element is indirectly "on" or "connected to" the other element.

First Embodiment

Hereinafter, a controller for an internal combustion engine according to a first embodiment will be described with reference to FIGS. 1 to 7.

Figure 1:
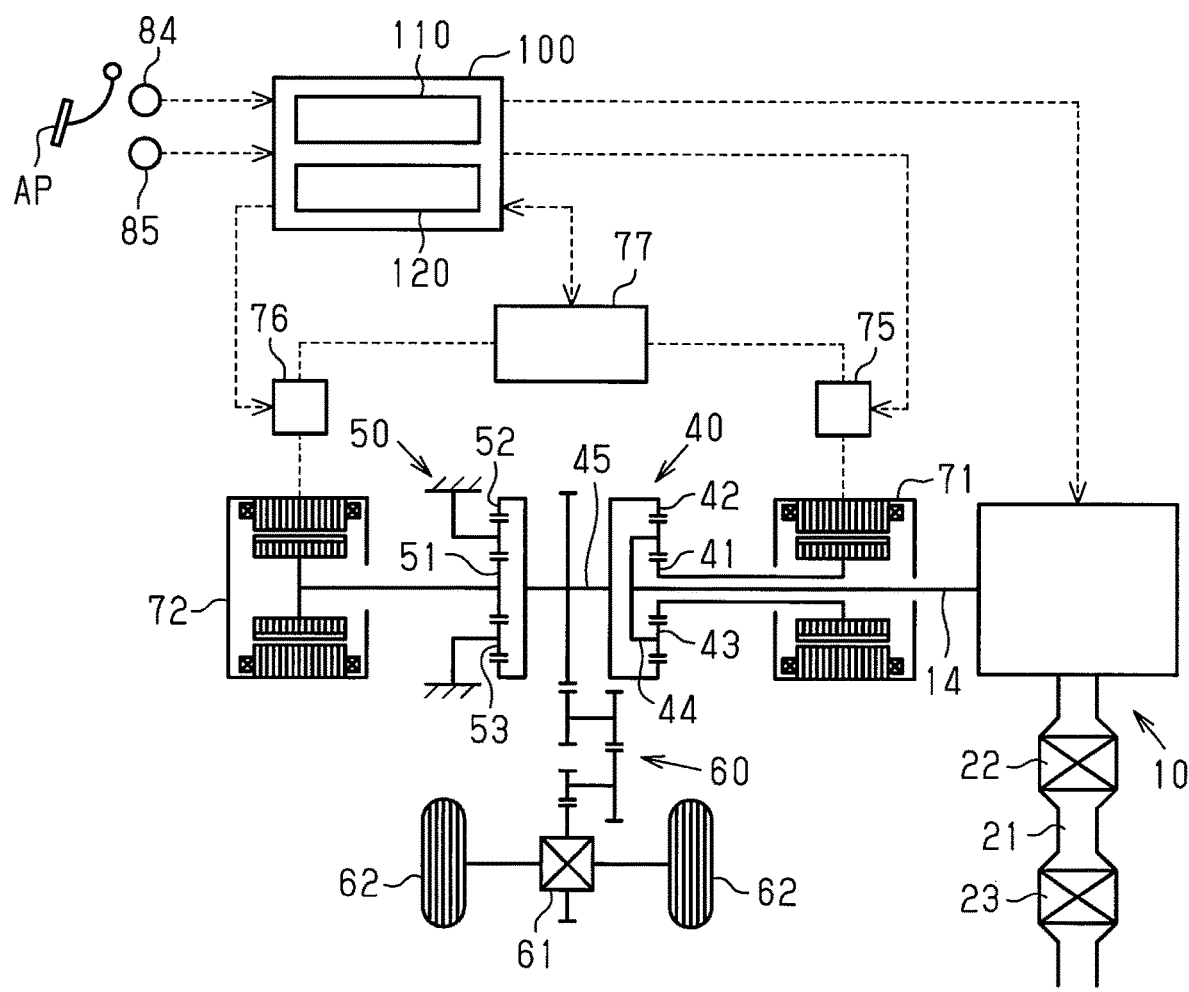
FIG. 1 is a schematic diagram showing a controller including an engine control unit and a hybrid vehicle on which the controller is mounted according to a first embodiment.

FIG. 1 shows a schematic configuration of a hybrid vehicle. As shown in FIG. 1, a hybrid vehicle includes an internal combustion engine 10 of a spark ignition type, a power distribution integration mechanism 40 connected to a crankshaft 14 of the internal combustion engine 10, and a first motor generator 71 connected to the power distribution integration mechanism 40. A second motor generator 72 is connected to the power distribution integration mechanism 40 via a reduction gear 50, and drive wheels 62 are connected to the power distribution integration mechanism 40 via a speed reduction mechanism 60 and a differential 61.

The power distribution integration mechanism 40 is a planetary gear mechanism, and includes a sun gear 41 of an external gear, and a ring gear 42 of an internal gear coaxially arranged with the sun gear 41. Pinion gears 43 are disposed between the sun gear 41 and the ring gear 42 and mesh with the sun gear 41 and the ring gear 42. Each pinion gear 43 is supported by a carrier 44 so that the pinion gear 43 is capable of rotating and revolving. The first motor generator 71 is connected to the sun gear 41. The crankshaft 14 is connected to the carrier 44. A ring gear shaft 45 is connected to the ring gear 42, and the reduction gear 50 and the speed reduction mechanism 60 are connected to the ring gear shaft 45.

When an output torque of the internal combustion engine 10 is input to the carrier 44, the output torque is divided into a component for the sun gear 41 and a component for the ring gear 42. More specifically, when the output torque of the internal combustion engine 10 is input to the first motor generator 71, the first motor generator 71 generates power.

When the first motor generator 71 is used as an electric motor, the output torque of the first motor generator 71 is input to the sun gear 41. The output torque of the first motor generator 71 input to the sun gear 41 is divided into to a component for the carrier 44 and a component for the ring gear 42. When the output torque of the first motor generator 71 is input to the crankshaft 14 through the carrier 44, the crankshaft 14 is rotated. In the first embodiment, such rotation of the crankshaft 14 caused by driving the first motor generator 71 is referred to as "motoring."

The reduction gear 50 is a planetary gear mechanism, and includes a sun gear 51 of an external gear and a ring gear 52 of an internal gear coaxially arranged with the sun gear 51. The sun gear 51 is connected to the second motor generator 72. A ring gear shaft 45 is connected to the ring gear 52. Pinion gears 53 are disposed between the sun gear 51 and the ring gear 52 and mesh with the sun gear 51 and the ring gear 52. While each pinion gear 53 is free to rotate, the pinion gear 53 cannot revolve.

When decelerating the vehicle, the second motor generator 72 is used as a power generator, so that the vehicle generates a regenerative braking force corresponding to the amount of power generated by the second motor generator 72. When the second motor generator 72 is used as an electric motor, the output torque of the second motor generator 72 is input to the drive wheels 62 through the reduction gear 50, the ring gear shaft 45, the speed reduction mechanism 60 and the differential 61. This allows the drive wheels 62 to rotate resulting in the vehicle traveling.

The first motor generator 71 exchanges power with a battery 77 through a first inverter 75. The second motor generator 72 exchanges power with the battery 77 through a second inverter 76.

Figure 2:
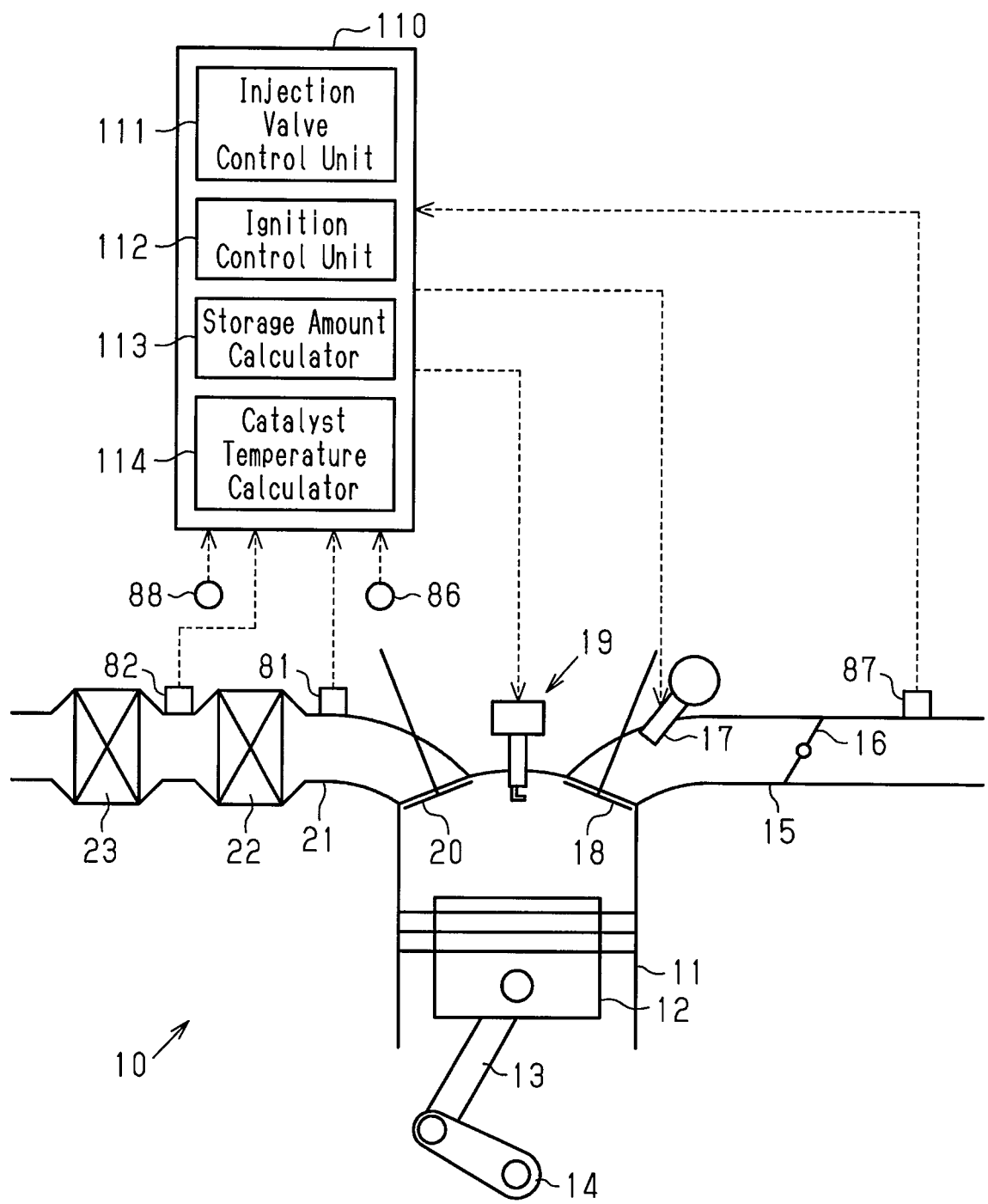
FIG. 2 is a diagram showing a functional configuration of the engine control unit and a schematic configuration of an internal combustion engine mounted on the hybrid vehicle according to the first embodiment.

As shown in FIG. 2, the internal combustion engine 10 includes a cylinder 11 that accommodates a piston 12 configured to reciprocate. The piston 12 is coupled to the crankshaft 14 by a connecting rod 13. A crank angle sensor 86 detects an engine rotational speed NE, which is the rotational speed of the crankshaft 14.

A throttle valve 16 is provided in an intake passage 15 of the internal combustion engine 10 and rotates to adjust an intake air amount GA of the cylinder 11. The intake air amount GA is detected by an air flow meter 87. The air flow meter 87 is disposed in the intake passage 15 at the upstream side of the throttle valve 16.

The internal combustion engine 10 further includes a fuel injection valve 17 disposed in the intake passage 15 at the downstream side of the throttle valve 16 to inject fuel. When an intake valve 18 is open, fuel and air are drawn into the cylinder 11 through the intake passage 15. In the cylinder 11, air-fuel mixture containing the air drawn through the intake passage 15 and the fuel injected from the fuel injection valve 17 is burned by a spark discharge of an ignition device 19. The combustion of the air-fuel mixture generates exhaust gas in the cylinder 11, and the exhaust gas is discharged to an exhaust passage 21 when an exhaust valve 20 is open. The exhaust passage 21 includes a three-way catalyst 22 and a particulate filter 23 disposed at the downstream side of the three-way catalyst 22. The particulate filter 23 is capable of capturing particulate matter contained in the exhaust gas flowing through the exhaust passage 21.

An air-fuel ratio sensor 81 is disposed upstream of the three-way catalyst 22 in the exhaust passage 21 to detect an oxygen concentration in the gas flowing through the exhaust passage 21, that is, the air-fuel ratio of the air-fuel mixture. Further, a temperature sensor 82 is disposed between the three-way catalyst 22 and the particulate filter 23 in the exhaust passage 21 to detect the temperature of gas flowing through the exhaust passage 21. The internal combustion engine 10 further includes a differential pressure sensor 88 that detects a differential pressure ΔPex between a portion of the exhaust passage 21 between the particulate filter 23 and the three-way catalyst 22 and a portion of the exhaust passage 21 located at the downstream side of the particulate filter 23.

In the internal combustion engine 10, the combustion of the air-fuel mixture in the cylinder 11 may be stopped when the vehicle is traveling and the crankshaft 14 is rotating. The period during which the combustion of the air-fuel mixture in the cylinder 11 is stopped when the crankshaft 14 is rotating is referred to as a "combustion stoppage period CSP." In the combustion stoppage period CSP, the piston 12 reciprocates in synchronization with the rotation of the crankshaft 14. Thus, the air drawn into the cylinder 11 through the intake passage 15 flows out to the exhaust passage 21 without being used for combustion.

In the combustion stoppage period CSP, one of a fuel cut process and a fuel feeding process is selectively executed. In the fuel cut process, the fuel injection of the fuel injection valve 17 is stopped. In the fuel feeding process, fuel is injected from the fuel injection valve 17, and the fuel flows out of the cylinder 11 into the exhaust passage 21 in an unburned state. When the fuel feeding process is executed, the fuel injected from the fuel injection valve 17 flows through the exhaust passage 21 with air. The fuel is drawn into the three-way catalyst 22. When the fuel is drawn into the three-way catalyst 22, if the temperature of the three-way catalyst 22 is greater than or equal to an activation temperature and the amount of oxygen in the three-way catalyst 22 is sufficient for burning fuel, the fuel is burned in the three-way catalyst 22. As a result, the temperature of the three-way catalyst 22 increases. When the heat generated by the three-way catalyst 22 is transmitted to the particulate filter 23 through the gas flowing through the exhaust passage 21, the temperature of the particulate filter 23 increases. Then, when oxygen is supplied to the particulate filter 23 and the temperature of the particulate filter 23 is greater than or equal to a temperature of combustion, the particulate matter captured by the particulate filter 23 is burned.

Next, a control configuration of the hybrid vehicle will be described with reference to FIGS. 1 and 2.

As shown in FIG. 1, a controller 100 for the hybrid vehicle calculates a request torque TQR, which is a torque to be output to the ring gear shaft 45, based on an accelerator operation amount ACC and a vehicle speed VS. The accelerator operation amount ACC is an amount of an accelerator pedal AP depressed by the driver of the vehicle and is a value detected by an accelerator operation amount sensor 84. The vehicle speed VS is a value corresponding to the travel speed of the vehicle and is detected by a vehicle speed sensor 85. The controller 100 controls the internal combustion engine 10 and the motor generators 71 and 72 based on the calculated request torque TQR. The controller 100 or an element of the controller 100 may be configured as circuitry including: 1) one or more processors that operate in accordance with a computer program (software); 2) one or more dedicated hardware circuits such as an application specific integrated circuit (ASIC) that executes at least one or more of various processes; or 3) a combination of these. The processor includes a CPU as well as memory such as a RAM and a ROM. The memory stores program codes or commands configured to cause the CPU to execute processes. The memory, that is, a computer readable medium, includes various usable media that can be accessed by a general-purpose or dedicated computer.

The controller 100 includes an engine control unit 110 that controls the internal combustion engine 10 and a motor control unit 120 that controls each of the motor generators 71 and 72. The engine control unit 110 corresponds to an example of "the controller for the internal combustion engine" in the first embodiment. When the fuel feeding process is executed during the combustion stoppage period CSP, the motor control unit 120 controls the driving of the first motor generator 71 so that the motoring is performed. More specifically, the rotational speed of the crankshaft 14 during the combustion stoppage period CSP is controlled through the motoring.

FIG. 2 shows a functional configuration of the engine control unit 110. The engine control unit 110 includes an injection valve control unit 111, an ignition control unit 112, a storage amount calculator 113, and a catalyst temperature calculator 114 as functional units.

The injection valve control unit 111 controls the fuel injection valve 17. More specifically, when burning the air-fuel mixture in the cylinder 11, the injection valve control unit 111 calculates a request value QPR of the fuel injection amount so that an air-fuel ratio detection value AFS is a target air-fuel ratio AFTr. The air-fuel ratio detection value AFS is an air-fuel ratio detected by the air-fuel ratio sensor 81. When burning the air-fuel mixture in the cylinder 11, the target air-fuel ratio AFTr is set to, for example, a stoichiometric air-fuel ratio or a value close to the stoichiometric air-fuel ratio. The injection valve control unit 111 controls the driving of the fuel injection valve 17 based on the calculated request value QPR. When the combustion stoppage period CSP ends and combustion of the air-fuel mixture is resumed in the cylinder 11, the injection valve control unit 111 executes the enrichment process that controls the fuel injection valve 17 so that the air-fuel ratio is set to be richer than the stoichiometric air-fuel ratio. The enrichment process will be described later.

In addition, the injection valve control unit 111 may control the fuel injection valve 17 even during the combustion stoppage period CSP. The control of the fuel injection valve 17 during the combustion stoppage period CSP will be described later.

The ignition control unit 112 controls the ignition device 19. More specifically, when burning the air-fuel mixture in the cylinder 11, the ignition control unit 112 causes the ignition device 19 to perform spark discharge when the piston 12 reaches the proximity of compression top dead center. During the combustion stoppage period CSP, the ignition control unit 112 does not cause the ignition device 19 to perform spark discharge.

The storage amount calculator 113 calculates an estimated value Ce of the oxygen storage amount in the three-way catalyst 22. The process of calculating the estimated value Ce of the oxygen storage amount will be described later.

The catalyst temperature calculator 114 calculates a catalyst temperature TPSC, which is an estimated value of the temperature of the three-way catalyst 22. It may be assumed that as the temperature of gas passing through the three-way catalyst 22 toward the particulate filter 23 increases, the temperature of the three-way catalyst 22 increases. Therefore, the catalyst temperature calculator 114 calculates the catalyst temperature TPSC, for example, so that the temperature of the three-way catalyst 22 increases as the temperature of gas detected by the temperature sensor 82 increases.

Figure 3:
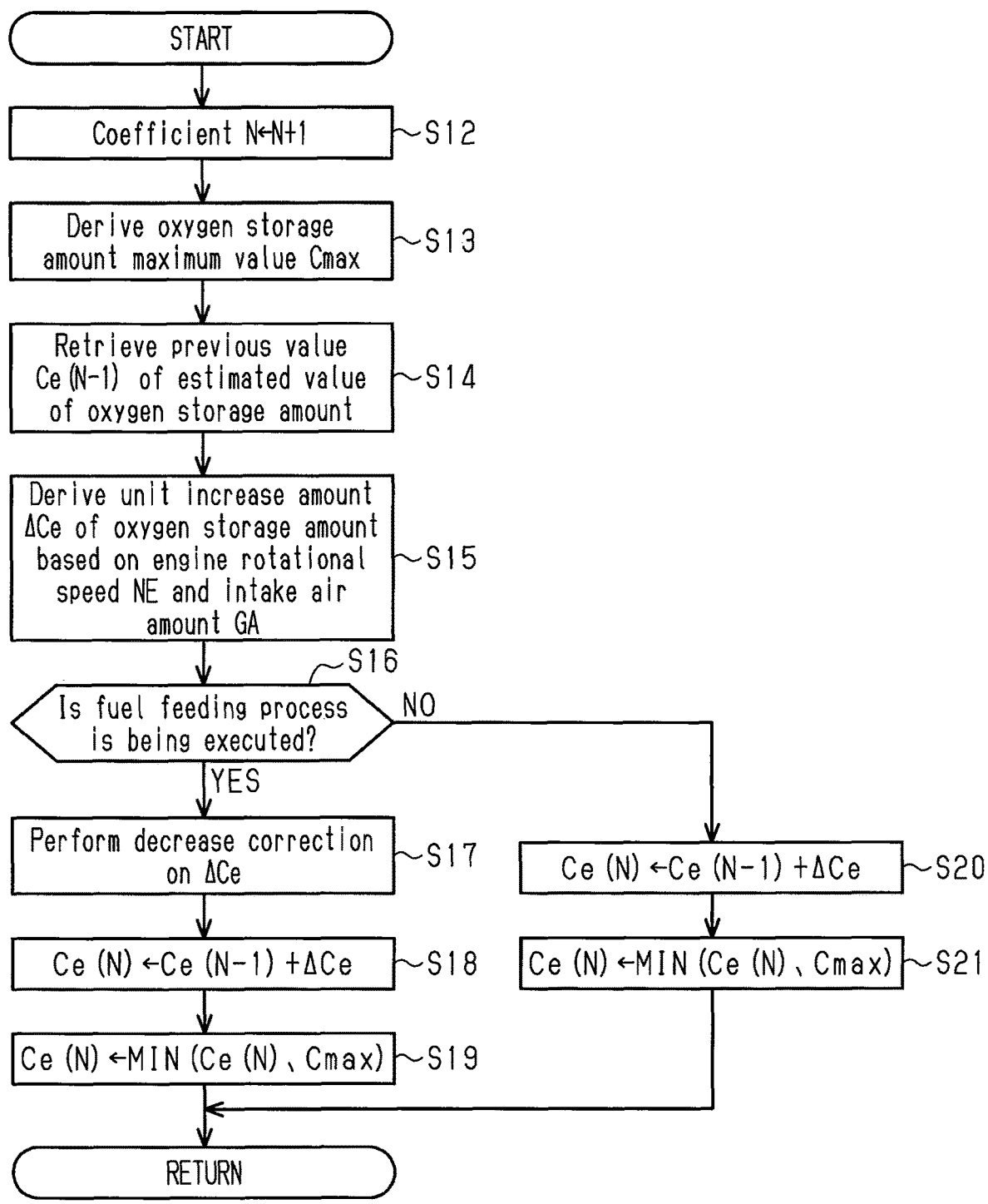
FIG. 3 is a flowchart showing a procedure for calculating an estimated value of an oxygen storage amount of a three-way catalyst during the combustion stoppage period according to the first embodiment.

Next, a flow of processes executed by the storage amount calculator 113 to calculate the estimated value Ce of the oxygen storage amount of the three-way catalyst 22 during the combustion stoppage period CSP will be described with reference to FIG. 3. The series of processes shown in FIG. 3 is repeated during the combustion stoppage period CSP.

In the series of processes shown in FIG. 3, in the first step denoted by S12, the coefficient N is incremented by "1." Subsequently, in the next step denoted by S13, the maximum value Cmax of the oxygen storage amount of the three-way catalyst 22 is derived.

The maximum value Cmax of the oxygen storage amount of the three-way catalyst 22 changes with the temperature of the three-way catalyst 22. Thus, the storage amount calculator 113 calculates the maximum value Cmax based on the catalyst temperature TPSC calculated by the catalyst temperature calculator 114.

When the calculation of the maximum value Cmax is completed, the process proceeds to the next step denoted by S14. In step S14, the previous value Ce(N−1) of the estimated value Ce of the oxygen storage amount is retrieved. The previous value Ce(N−1) of the estimated value of the oxygen storage amount is the estimated value Ce of the oxygen storage amount calculated when the coefficient is "N−1." Subsequently, in the next step denoted by S15, a unit increase amount ΔCe of the oxygen storage amount, which is an estimated value of an increase amount of the oxygen storage amount per unit time, is calculated.

When the crankshaft 14 is rotating during the combustion stoppage period CSP, the air drawn from the intake passage 15 into the cylinder 11 is discharged to the exhaust passage 21 without undergoing any change. Then, oxygen contained in the air flowing through the exhaust passage 21 is stored in the three-way catalyst 22. At this time, as the flow rate of gas in the exhaust passage 21 increases, the increase amount of the oxygen storage amount per unit time increases. During the combustion stoppage period CSP, the flow rate of gas in the exhaust passage 21 depends on the engine rotational speed NE and the intake air amount GA. More specifically, as the engine rotational speed NE increases, the flow rate of gas in the exhaust passage 21 tends to increase. Additionally, as the opening degree of the throttle valve 16 increases and the intake air amount GA increases, the flow rate of gas in the exhaust passage 21 tends to increase. Therefore, in step S15, the unit increase amount ΔCe of the oxygen storage amount is calculated based on the engine rotational speed NE and the intake air amount GA. More specifically, the unit increase amount ΔCe that is calculated increases as the engine rotational speed NE increases. Also, the unit increase amount ΔCe that is calculated increases as the intake air amount GA increases.

When the calculation of the unit increase amount ΔCe is completed, the process proceeds to the next step denoted by S16. In step S16, it is determined whether or not the fuel feeding process is being executed. When the fuel feeding process is being executed (S16: YES), the process proceeds to the next step denoted by S17. In step S17, reduction correction is performed on the unit increase amount ΔCe calculated in step S15. When the fuel feeding process is being executed, the unburned fuel drawn in the three-way catalyst 22 is burned. The burning of the unburned fuel consumes oxygen. Thus, during the execution of the fuel feeding process, the increase rate of the oxygen storage amount of the three-way catalyst 22 is less than during the execution of the fuel cut process. Hence, reduction correction is performed on the unit increase amount ΔCe so that the unit increase amount ΔCe decreases as the amount of unburned fuel drawn into the three-way catalyst 22 increases. That is, reduction correction is performed on the unit increase amount ΔCe so that the unit increase amount ΔCe decreases as the fuel injection amount of the fuel injection valve 17 increases.

More specifically, reduction correction is performed on the unit increase amount ΔCe using the following relational expression (expression 1). In the relational expression (expression 1), "ERfc" is an equivalent ratio during the execution of the fuel feeding process. The fuel injection amount of the fuel injection valve 17 needed to control the air-fuel ratio to the stoichiometric air-fuel ratio is referred to as the stoichiometric fuel injection amount. The equivalent ratio ERfc is a value obtained by dividing an actual fuel injection amount of the fuel injection valve 17 by the stoichiometric fuel injection amount. Thus, the equivalent ratio ERfc increases as the fuel injection amount during the execution of the fuel feeding process increases. Therefore, the reduction correction amount of the unit increase amount ΔCe increases as the fuel injection amount during the execution of the fuel feeding process increases.

$$\Delta Ce \leftarrow \Delta Ce \cdot (1 - ERfc) \qquad \text{(Expression 1)}$$

When the reduction correction of the unit increase amount ΔCe is completed, the process proceeds to the next step denoted by S18. In step S18, an estimated value Ce(N) of the oxygen storage amount of the three-way catalyst 22 is calculated. More specifically, an estimated value Ce(N) of the oxygen storage amount is calculated by adding the unit increase amount ΔCe to the previous value Ce(N−1) of the estimated value of the oxygen storage amount. That is, the estimated value Ce of the oxygen storage amount is calculated through accumulation of the unit increase amount ΔCe. Thus, the increase rate of the estimated value Ce of the oxygen storage amount increases as the unit increase amount ΔCe increases. Therefore, in the first embodiment, the unit increase amount ΔCe corresponds to the increase rate of the estimated value Ce of the oxygen storage amount during the combustion stoppage period CSP. More specifically, the estimated value Ce of the oxygen storage amount reflects the tendency of the increase rate of the oxygen storage amount of the three-way catalyst 22 to be lower during the execution of the fuel feeding process than during the execution of the fuel cut process. In other words, the increase rate of the estimated value Ce of the oxygen storage amount has a tendency to be lower during the execution of the fuel feeding process than during the execution of the fuel cut process.

Subsequently, in the next step denoted by S19, the smaller one of the estimated value Ce(N) of the oxygen storage amount calculated in step S18 and the maximum value Cmax of the oxygen storage amount derived in step S13 is set to the estimated value Ce(N) of the oxygen storage amount. Then, when the calculated estimated value Ce(N) is stored in the memory, the series of processes is temporarily ended.

When the fuel feeding process is not being executed (S16: NO), the fuel cut process is being executed, and the process proceeds to the next step denoted by S20. In step S20, an estimated value Ce(N) of the oxygen storage amount of the three-way catalyst 22 is calculated. More specifically, the estimated value Ce(N) of the oxygen storage amount is calculated by adding the unit increase amount ΔCe calculated in step S15 to the previous value Ce(N−1) of the estimated value of the oxygen storage amount. Subsequently, in the next step denoted by S21, the smaller one of the estimated value Ce(N) of the oxygen storage amount calculated in step S20 and the maximum value Cmax of the oxygen storage amount derived in step S13 is set to the estimated value Ce(N) of the oxygen storage amount. Then, when the calculated estimated value Ce(N) is stored in the memory, the series of processes is temporarily ended.

In the first embodiment, during the execution of the fuel cut process, the estimated value Ce of the oxygen storage amount is calculated through accumulation of the unit increase amount ΔCe that has not undergone reduction correction. That is, during the execution of the fuel cut process, the estimated value Ce of the oxygen storage amount is calculated so that the increase rate of the oxygen storage amount increases as the flow rate of the gas in the exhaust passage 21 increases. The unit increase amount ΔCe reflects the tendency of the increase rate of the oxygen storage amount of the three-way catalyst 22 to increase as the flow rate of gas in the exhaust passage 21 increases. Thus, the estimated value Ce of the oxygen storage amount reflects the tendency of the increase rate of the oxygen storage amount of the three-way catalyst 22 to increase as the flow rate of gas in the exhaust passage 21 increases. In other words, the increase rate of the estimated value Ce of the oxygen storage amount has a tendency to increase as the flow rate of gas in the exhaust passage 21 increases. On the other hand, during the execution of the fuel feeding process, the estimated value Ce of the oxygen storage amount is calculated through accumulation of the unit increase amount ΔCe that has undergone reduction correction. More specifically, during the execution of the fuel feeding process, the estimated value Ce of the oxygen storage amount is calculated so that the increase rate of the oxygen storage amount increases as the flow rate of gas in the exhaust passage 21 increases. That is, the estimated value Ce of the oxygen storage amount reflects the tendency of the increase rate of the oxygen storage amount of the three-way catalyst 22 to increase as the flow rate of gas in the exhaust passage 21 increases. In other words, the increase rate of the estimated value Ce of the oxygen storage amount has a tendency to increase as the flow rate of gas in the exhaust passage 21 increases. Additionally, during the execution of the fuel feeding process, the estimated value Ce of the oxygen storage amount is calculated so that the increase rate of the oxygen storage amount decreases as the fuel injection amount of the fuel injection valve 17 increases. More specifically, the estimated value Ce of the oxygen storage amount reflects the tendency of the increase rate of the oxygen storage amount to decrease as the fuel injection amount of the fuel injection valve 17 increases. The increase rate of the estimated value Ce of the oxygen storage amount has a tendency to decrease as the fuel injection amount of the fuel injection valve 17 increases. As described above, the estimated value Ce of the oxygen storage amount tends to be calculated so that the increase rate of the oxygen storage amount of the three-way catalyst 22 is lower during the execution of the fuel feeding process than during the execution of the fuel cut process.

Figure 4:
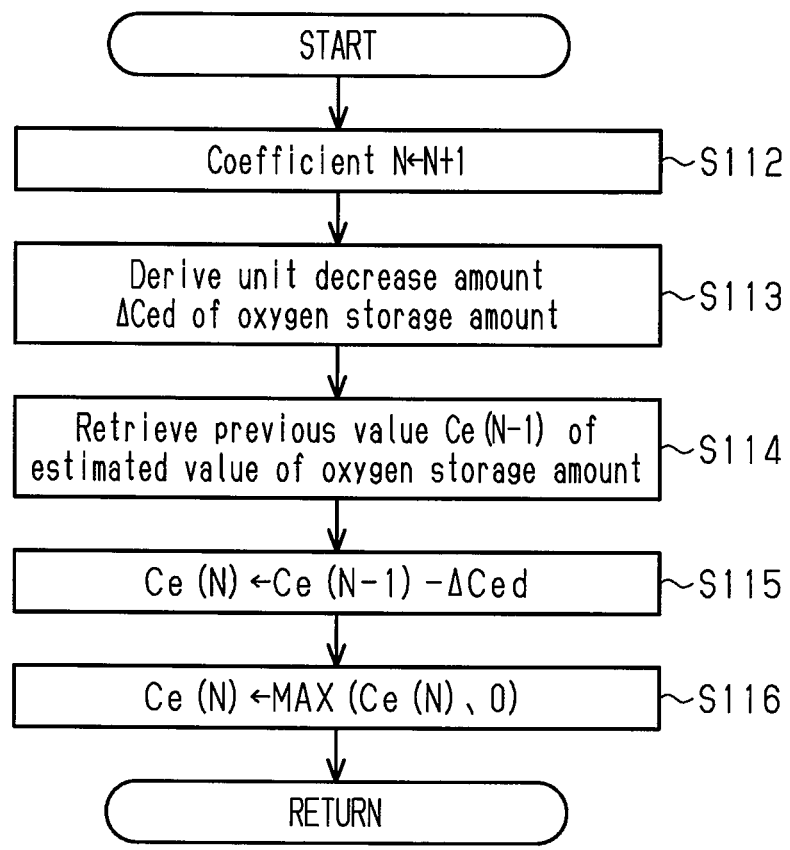
FIG. 4 is flowchart showing a procedure for calculating an estimated value of the oxygen storage amount of the three-way catalyst during execution of an enrichment process according to the first embodiment.

Next, a flow of processes executed by the storage amount calculator 113 to calculate the estimated value Ce of the oxygen storage amount of the three-way catalyst 22 during execution of the enrichment process when resuming combustion of the air-fuel mixture in the cylinder 11 will be described with reference to FIG. 4. The series of processes shown in FIG. 4 is repeated during the execution of the enrichment process.

In the series of processes shown in FIG. 4, in the first step denoted by S112, the coefficient N is incremented by "1." Subsequently, in the next step denoted by S113, a unit decrease amount ΔCed of the oxygen storage amount, which is an estimated value of the decrease amount per unit time of the oxygen storage amount, is calculated. The unit decrease amount ΔCed is a value that is greater than or equal to zero.

Although details will be described later, during the execution of the enrichment process, the air-fuel ratio is richer than the stoichiometric air-fuel ratio. Thus, the oxygen storage amount of the three-way catalyst 22 is decreased. At this time, the decrease rate of the oxygen storage amount increases as the fuel injection amount of the fuel injection valve 17 increases. Hence, in the first embodiment, the unit decrease amount ΔCed is calculated so that the unit decrease amount ΔCed increases as the request value QPR of the fuel injection amount increases.

When the unit decrease amount ΔCed is calculated, the process proceeds to the next step denoted by S114. In step S114, the previous value Ce(N−1) of the estimated value of the oxygen storage amount is retrieved. Subsequently, in the next step denoted by S115, an estimated value Ce(N) of the oxygen storage amount is calculated by subtracting the unit decrease amount ΔCed from the previous value Ce(N−1) of the estimated value of the oxygen storage amount. In step S116, the greater one of the calculated estimated value Ce of the oxygen storage amount and the estimated value Ce is set to zero. When the estimated value Ce calculated in this manner is stored in the memory, the series of processes is temporarily ended.

Next, a flow of processes executed by the injection valve control unit 111 to control the driving of the fuel injection valve 17 during the combustion stoppage period CSP will be described with reference to FIG. 5. The series of processes shown in FIG. 5 is repeated during the combustion stoppage period CSP.

Figure 5:
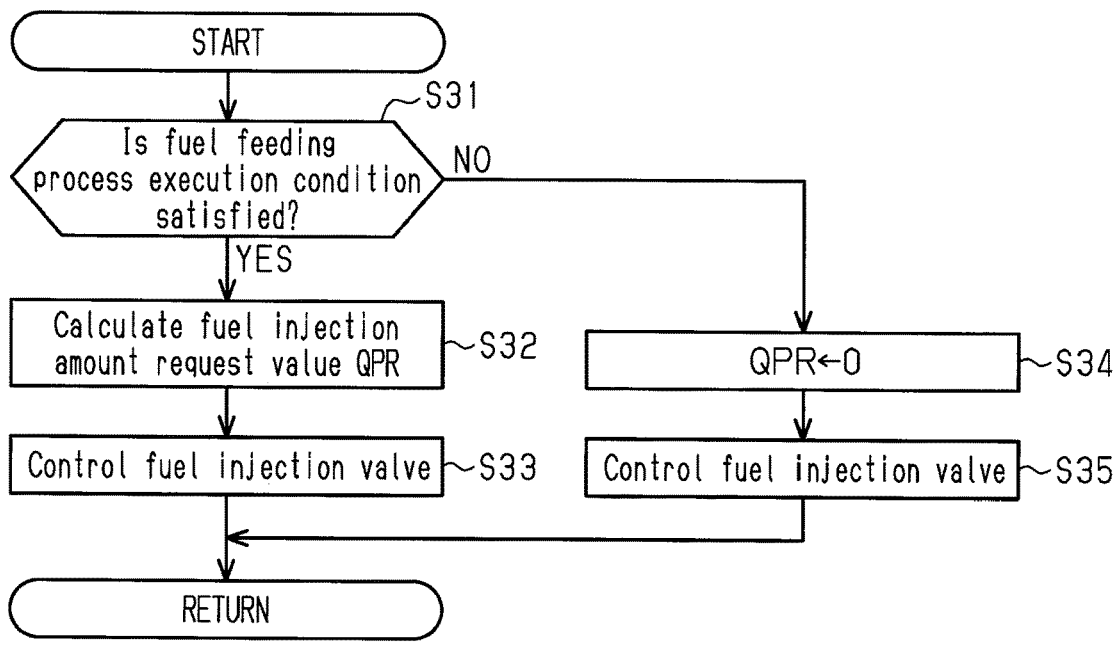
FIG. 5 is a flowchart showing a procedure for controlling a fuel injection valve during the combustion stoppage period according to the first embodiment.

In the series of processes shown in FIG. 5, in the first step S31, it is determined whether or not the condition for executing the fuel feeding process is satisfied.

Here, the execution condition of the fuel feeding process will be described. In the first embodiment, when the following two conditions are both satisfied, it is determined that the execution condition is satisfied.

(Condition 1) It is determined that the temperature of the three-way catalyst 22 is greater than or equal to a specified temperature.

(Condition 2) The estimated value of the amount of particulate matter captured by the particulate filter 23 is greater than or equal to a capture determination amount.

In the case of condition 1, even when unburned fuel is drawn into the three-way catalyst 22, the fuel may not be burned if the temperature of the three-way catalyst 22 is low. In this regard, a specified temperature is set to be a reference temperature for determining whether the unburned fuel drawn into the three-way catalyst 22 can be burned. More specifically, the specified temperature is set to the activation temperature or a temperature slightly greater than the activation temperature of the three-way catalyst 22.

In the case of condition 2, as the amount of particulate matter captured in the particulate filter 23 increases, clogging of the particulate filter 23 advances. In this regard, the capture determination amount is set to be a reference amount for determining whether or not the clogging has advanced to a level that needs regeneration of the particulate filter 23. When the captured amount increases, the differential pressure ΔPex between the portion of the exhaust passage 21 between the three-way catalyst 22 and the particulate filter 23 and the portion of the exhaust passage 21 located at the downstream side of the particulate filter 23 tends to increase. Thus, the estimated value of the captured amount may be calculated, for example, based on the differential pressure ΔPex.

When the execution condition of the fuel feeding process is satisfied and the fuel feeding process is started during the combustion stoppage period CSP, it is determined that the execution condition of the fuel feeding process is satisfied until the combustion stoppage period CSP ends.

When it is determined that the execution condition of the fuel feeding process is satisfied (step S31: YES), the fuel feeding process is being performed, and the process proceeds to the next step denoted by S32. In step S32, the request value QPR of the fuel injection amount of the fuel injection valve 17 is calculated. The request value QPR of the fuel injection amount obtained when the fuel feeding process is being performed is less than the request value QPR obtained when burning the air-fuel mixture in the cylinder 11.

When the request value QPR is calculated in step S32, the process proceeds to the next step denoted by S33. In step S33, the driving of the fuel injection valve 17 is controlled based on the calculated request value QPR. In this case, fuel is injected from the fuel injection valve 17 even during the combustion stoppage period CSP. Then, the series of processes is temporarily ended.

When it is determined that the execution condition of the fuel feeding process is not satisfied (step S31: NO), the fuel cut process is performed, and the process proceeds to the next step denoted by S34. In step S34, the request value QPR of the fuel injection amount is set to zero. Subsequently, in the next step denoted by S35, the driving of the fuel injection valve 17 is controlled based on the calculated request value QPR. In this case, fuel is not injected from the fuel injection valve 17. Then, the series of processes is temporarily ended.

Next, a flow of processes performed by the injection valve control unit 111 to execute the enrichment process when burning the air-fuel mixture in the cylinder 11 will be described with reference to FIG. 6. A series of processes shown in FIG. 6 is executed when combustion of the air-fuel mixture is resumed in the cylinder 11.

Figure 6:
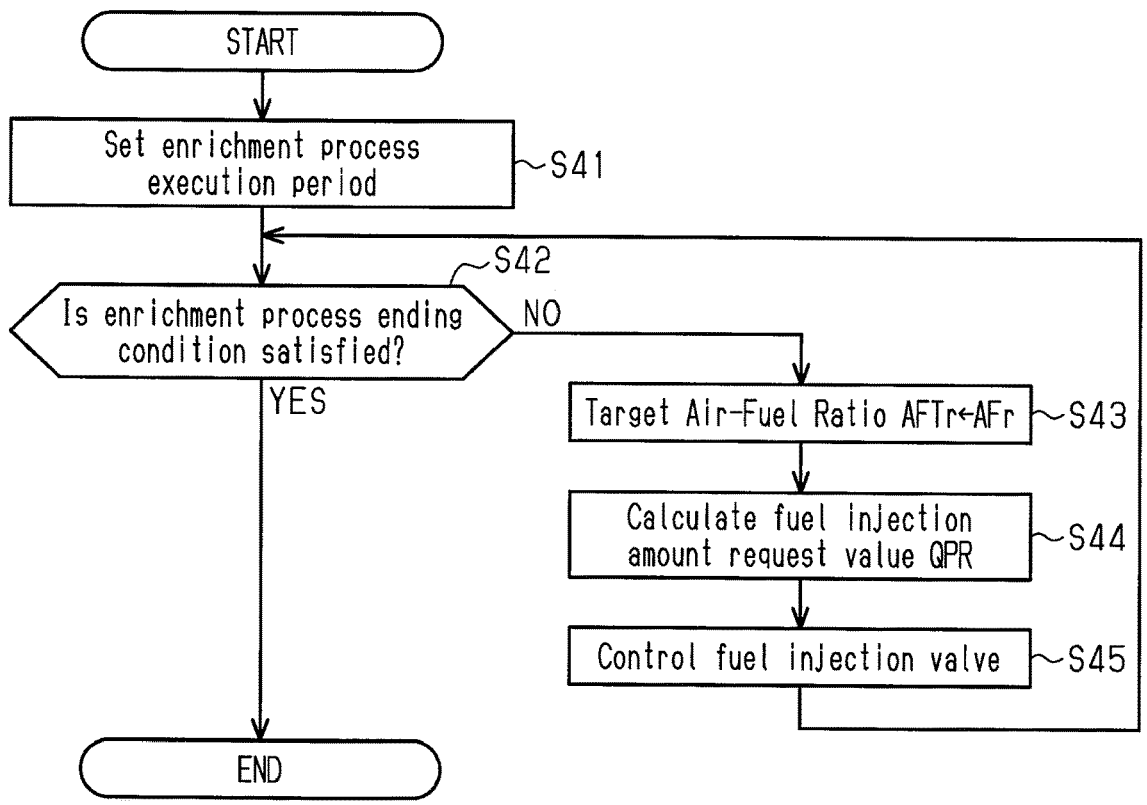
FIG. 6 is a flowchart showing a procedure when executing the enrichment process when combustion of air-fuel mixture in a cylinder is resumed according to the first embodiment.

In the series of processes shown in FIG. 6, in the first step S41, the length of the execution period of the enrichment process is set.

When the oxygen storage amount of the three-way catalyst 22 is maintained at a specified amount CTh or a value close to the specified amount CTh, the three-way catalyst 22 may operate. The specified amount CTh is a value that is greater than zero and less than the maximum value Cmax of the oxygen storage amount. During the combustion stoppage period CSP, air is not used for combustion in the cylinder 11 and is drawn into the three-way catalyst 22. Thus, at a point in time when the combustion stoppage period CSP ends, that is, at a point in time when the combustion of the air-fuel mixture is resumed in the cylinder 11, the oxygen storage amount of the three-way catalyst may be much greater than the specified amount CTh. Hence, the enrichment process is executed when the combustion of the air-fuel mixture is resumed in the cylinder 11.

When the enrichment process is executed as described above, the oxygen storage amount of the three-way catalyst 22 is decreased. The decrease amount of the oxygen storage amount corresponding to the enrichment process increases as the execution period of the enrichment process extends. In the first embodiment, to control the oxygen storage amount of the three-way catalyst 22 to the specified amount CTh by the execution of the enrichment process, the length of the execution period of the enrichment process is set when executing the enrichment process. Thus, in step S41, the length of the execution period is set so that when the estimated value Ce of the oxygen storage amount of the three-way catalyst 22 at the point in time when the combustion of the air-fuel mixture is resumed in the cylinder 11 is small, the execution period of the enrichment process is shorter than when the estimated value Ce is large. More specifically, in the first embodiment, the decrease amount of the oxygen storage amount of the three-way catalyst 22 corresponding to the enrichment process is set through the setting of the length of the execution period of the enrichment process.

Then, when the length of the execution period of the enrichment process is set, the process proceeds to the next step denoted by S42. In step S42, it is determined whether or not the end condition of the enrichment process is satisfied. Here, the condition for ending the enrichment process is that after the combustion of the air-fuel mixture is resumed in the cylinder 11, the duration of the enrichment process is greater than or equal to the execution period of the enrichment process set in step S41. The length of the execution period of the enrichment process set in step S41 is referred to as completion determination time. After the combustion of the air-fuel mixture is resumed in the cylinder 11, if the duration of the enrichment process is less than the completion determination time, it is determined that the end condition is not satisfied. If the duration of the enrichment process is greater than or equal to the completion determination time, it is determined that the end condition is satisfied.

When it is determined that the end condition is not satisfied (S42: NO), the process proceeds to the next step denoted by S43. In step S43, the target air-fuel ratio AFTr is set to the first air-fuel ratio AFr. The first air-fuel ratio AFr is richer than the stoichiometric air-fuel ratio. Subsequently, in step S44, the request value QPR of the fuel injection amount is calculated so that the air-fuel ratio detection value AFS becomes the target air-fuel ratio AFTr (=AFr). In step S45, the driving of the fuel injection valve 17 is controlled based on the calculated request value QPR. As a result, the fuel injection valve 17 injects a greater amount of fuel than when the target air-fuel ratio AFTr is the stoichiometric air-fuel ratio. That is, the enrichment process is executed. The process then proceeds to step S42 described above. More specifically, the enrichment process is continued until it is determined that the condition for ending the enrichment process is satisfied.

When the duration of the enrichment process is longer than or equal to the completion determination time and it is determined that the condition for ending the enrichment process is satisfied (step S42: YES), the series of processes is ended. That is, the enrichment process is ended. After the target air-fuel ratio AFTr is set to the stoichiometric air-fuel ratio, the driving of the fuel injection valve 17 is controlled.

Next, the operation and effects of the first embodiment will be described with reference to FIG. 7.

Figure 7:
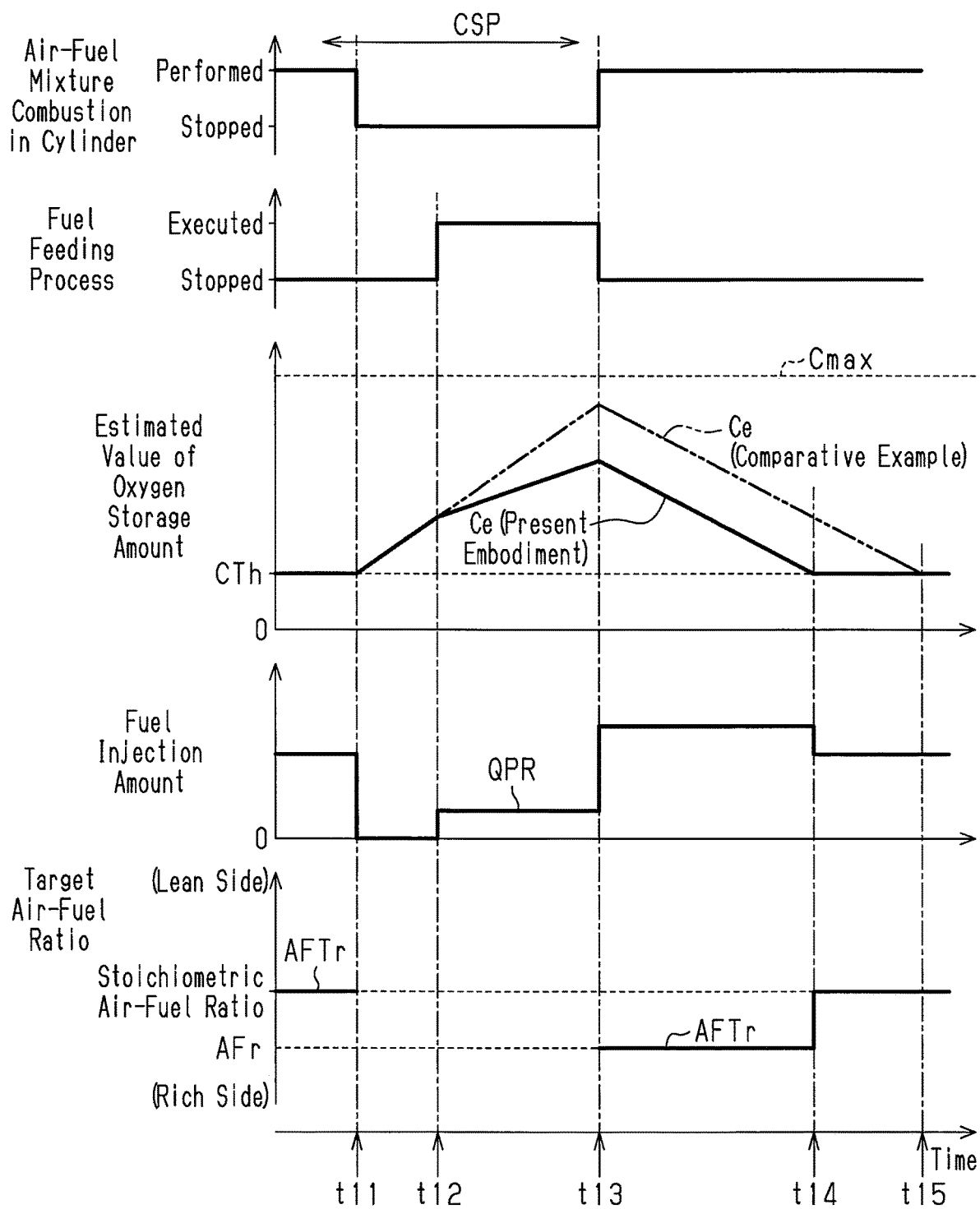
FIG. 7 is a time chart according to the first embodiment when the combustion stoppage period ends and the combustion of the air-fuel mixture is resumed in the cylinder.

As shown in FIG. 7, before time t11, fuel is injected from the fuel injection valve 17 with the target air-fuel ratio AFTr set to the stoichiometric air-fuel ratio, and the air-fuel mixture containing the fuel is burned in the cylinder 11. In this case, the oxygen storage amount of the three-way catalyst 22 subtly changes. At time t11, when the condition for stopping combustion of the air-fuel mixture in the cylinder 11 is satisfied, the combustion stoppage period CSP starts. Since the estimated value of the captured amount of particulate matter in the particulate filter 23 calculated at time t11 is less than the capture determination amount, the condition for executing the fuel feeding process is not satisfied. Thus, the fuel cut process is performed from time t11.

During the fuel cut process, the air drawn from the intake passage 15 into the cylinder 11 is not used for combustion and is discharged to the exhaust passage 21. More specifically, oxygen contained in the air is stored in the three-way catalyst 22. Thus, the estimated value Ce of the oxygen storage amount of the three-way catalyst 22 is increased. At this time, the increase rate of the estimated value Ce increases as the flow rate of air in the exhaust passage 21 increases.

When the estimated value of the captured amount of particulate matter in the particulate filter 23 calculated at time t12 during the combustion stoppage period CSP is greater than or equal to the capture determination amount, the condition for executing the fuel feeding process is satisfied. More specifically, at time t12, the process changes from the fuel cut process to the fuel feeding process.

During the execution of the fuel feeding process, the unburned fuel drawn into the three-way catalyst 22 is burned. At this time, the burning of the fuel consumes oxygen present in the three-way catalyst 22. Thus, during the execution of the fuel feeding process, the oxygen storage amount of the three-way catalyst 22 is increased more gradually than during the execution of the fuel cut process. Therefore, reduction correction is not performed on the unit increase amount ΔCe derived based on the engine rotational speed NE and the intake air amount GA during the execution of the fuel cut process, whereas reduction correction is performed on the unit increase amount ΔCe derived based on the engine rotational speed NE and the intake air amount GA during the execution of the fuel feeding process. As a result, during the execution of the fuel feeding process, the increase rate of the estimated value Ce of the oxygen storage amount is lower than during the execution of the fuel cut process.

At time t13, the condition for stopping the combustion of the air-fuel mixture in the cylinder 11 is not satisfied, and combustion of the air-fuel mixture is resumed in the cylinder 11. Then, the length of the execution period of the enrichment process is set based on the estimated value Ce of the oxygen storage amount obtained at time t13. In the example shown in FIG. 7, the period from time t13 to time t14 is the execution period of the enrichment process. Thus, the enrichment process is executed until time t14.

In the time chart showing changes in the estimated value Ce of the oxygen storage amount, the double-dashed line shows a comparative example that calculates the estimated value Ce without performing reduction correction on the unit increase amount ΔCe even during the execution of the fuel feeding process. In the comparative example, no consideration is made to the difference in the increase rate of the oxygen storage amount of the three-way catalyst 22 between the execution of the fuel feeding process and the execution of the fuel cut process. Therefore, when the fuel feeding process is executed during the combustion stoppage period CSP, the estimated value Ce calculated as in the comparative example deviates from the actual oxygen storage amount of the three-way catalyst 22.

Additionally, when the estimated value Ce is calculated as in the comparative example, the estimated value Ce at the point in time when the combustion of the air-fuel mixture is resumed in the cylinder 11 is larger than that in the first embodiment. As a result, when the length of the execution period of the enrichment process is set based on the estimated value Ce calculated as in the comparative example, the enrichment process is executed until time t15. In this case, the actual oxygen storage amount is considerably less than the specified amount CTh at the end of the enrichment process. This may decrease the accuracy of estimating the oxygen storage amount within a period during which the air-fuel mixture is being burned in the cylinder 11 after the end of the enrichment process.

In this regard, in the first embodiment, the estimated value Ce of the oxygen storage amount is calculated in consideration of the difference in the increase rate of the oxygen storage amount of the three-way catalyst 22 during the execution of the fuel feeding process and the execution of the fuel cut process. This limits deviation of the estimated value Ce of the oxygen storage amount from the actual oxygen storage amount even when the fuel feeding process is executed during the combustion stoppage period CSP. That is, the estimated value Ce of the oxygen storage amount can be calculated with high accuracy. The length of the execution period of the enrichment process is set based on the estimated value Ce obtained as described above. In the example shown in FIG. 7, the execution of the enrichment process is ended at time t14, which is before time t15. This prevents the actual oxygen storage amount from being considerably less than the specified amount CTh at the end of the enrichment process. After the enrichment process is ended, the oxygen storage amount of the three-way catalyst 22 is maintained at the specified amount CTh or a value close to the specified amount CTh.

In the first embodiment, when executing enrichment process, the decrease amount of the oxygen storage amount of the three-way catalyst 22 in the enrichment process is set through adjustment of the length of the execution period of the enrichment process. Thus, the enrichment process is executed in accordance with the oxygen storage amount of the three-way catalyst 22 when resuming combustion of the air-fuel mixture in the cylinder 11. This limits deviation of the oxygen storage amount of the three-way catalyst 22 from the specified amount CTh, which would otherwise be caused by the execution of the enrichment process.

If the execution period of the enrichment process is excessively long in relation to the oxygen storage amount of the three-way catalyst 22 at the time of resuming combustion of the air-fuel mixture in the cylinder 11, the oxygen stored in the three-way catalyst 22 may become depleted during the execution of the enrichment process. When the enrichment process is continued even after the depletion of oxygen, the emission property may be adversely affected. In this regard, in the first embodiment, the length of the execution period of the enrichment process is optimized so that the depletion of the oxygen stored in the three-way catalyst 22 is prevented during the execution of the enrichment process. Accordingly, the adverse effects on the emission property caused by the execution of the enrichment process may be limited. Further, optimization of the length of the execution period of the enrichment process limits adverse effects on the fuel efficiency of the internal combustion engine 10.

The double-dashed line shown in the time chart showing changes in the estimated value Ce of the oxygen storage amount may also show changes in the estimated value Ce when the fuel feeding process is not executed during the combustion stoppage period CSP. When the fuel feeding process is not executed during the combustion stoppage period CSP, the oxygen storage amount of the three-way catalyst 22 at the point in time when the combustion of the air-fuel mixture is resumed in the cylinder 11 is greater than when the fuel feeding process is executed during the combustion stoppage period CSP. Thus, when the fuel feeding process is not executed during the combustion stoppage period CSP, the execution period of the enrichment process is longer than when the fuel feeding process is executed during the combustion stoppage period CSP. More specifically, in the first embodiment, when the fuel feeding process is executed during the combustion stoppage period CSP and the stop of the combustion of the air-fuel mixture in the cylinder 11 is interrupted and the combustion of the air-fuel mixture is resumed in the cylinder 11, the enrichment process is executed so that the decrease amount of the oxygen storage amount of the three-way catalyst 22 corresponding to the enrichment process is less than when the fuel feeding process is not executed during the combustion stoppage period CSP.

However, when the combustion stoppage period CSP is long, the oxygen storage amount of the three-way catalyst 22 may reach the maximum value Cmax even when the fuel feeding process is executed during the combustion stoppage period CSP. The execution period of the enrichment process that is set when the fuel feeding process is executed during the combustion stoppage period CSP and the estimated value Ce of the oxygen storage amount is the maximum value Cmax at the point in time when the combustion of the air-fuel mixture is resumed in the cylinder 11 has the same length as the execution period of the enrichment process that is set when the fuel feeding process is not executed during the combustion stoppage period CSP. More specifically, an enrichment process that is executed when the fuel feeding process is not executed during the combustion stoppage period CSP and the oxygen storage amount of the three-way catalyst 22 reaches the maximum value Cmax is referred to as a first enrichment process. An enrichment process that is executed when the fuel feeding process is executed during the combustion stoppage period CSP and the oxygen storage amount of the three-way catalyst 22 does not reach the maximum value Cmax is referred to as a second enrichment process. In this case, an enrichment process that is executed when the fuel feeding process is executed during the combustion stoppage period CSP but the oxygen storage amount of the three-way catalyst 22 reaches the maximum value Cmax is not the second enrichment process but is the first enrichment process. Thus, when the enrichment process is executed, the oxygen storage amount of the three-way catalyst 22 is decreased to the proximity of the specified amount CTh.

Second Embodiment

Next, a second embodiment of a controller for an internal combustion engine will be described with reference to FIGS. 8 and 9. The second embodiment is different from the first embodiment in the process of setting the decrease amount of the oxygen storage amount corresponding to the enrichment process. Therefore, in the following description, parts different from the first embodiment will be mainly described, and the same reference characters are given to the same or corresponding components as the first embodiment to omit redundant description.

A flow of processes executed by the injection valve control unit 111 to execute the enrichment process when burning the air-fuel mixture in the cylinder 11 will be described with reference to FIG. 8. A series of processes shown in FIG. 8 is executed when combustion of the air-fuel mixture is resumed in the cylinder 11. In the second embodiment, the length of the execution period of the enrichment process is fixed at a predetermined value, which differs from the first embodiment.

Figure 8:
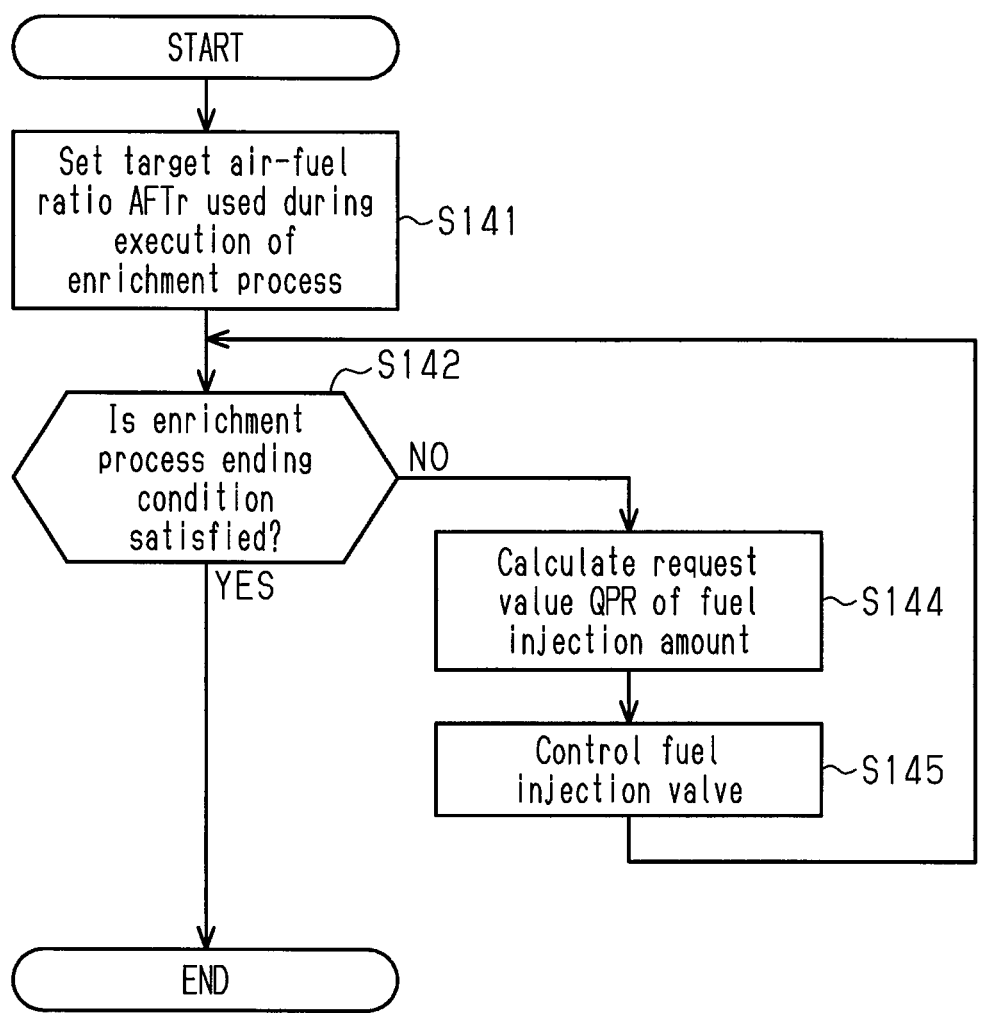
FIG. 8 is a flowchart showing a procedure when executing the enrichment process when combustion of air-fuel mixture is resumed in the cylinder according to a second embodiment.

In the series of processes shown in FIG. 8, in the first step denoted by S141, the target air-fuel ratio AFTr used during the execution of the enrichment process is set.

When the enrichment process is executed, the oxygen storage amount of the three-way catalyst 22 is decreased. The decrease amount of the oxygen storage amount corresponding to the enrichment process increases as the air-fuel ratio of the air-fuel mixture in the cylinder 11 during the enrichment process becomes richer. In the second embodiment, when executing the enrichment process, the target air-fuel ratio AFTr used during the execution of the enrichment process is set so that when the enrichment process is executed, the oxygen storage amount of the three-way catalyst 22 becomes the specified amount CTh. In step S141, the target air-fuel ratio AFTr used during the execution of the enrichment process is set so that as the estimated value Ce of the oxygen storage amount of the three-way catalyst 22 decreases at a point in time when the combustion of air-fuel mixture is resumed in the cylinder 11, the target air-fuel ratio AFTr becomes closer to the stoichiometric air-fuel ratio. More specifically, in the second embodiment, the decrease amount of the oxygen storage amount of the three-way catalyst 22 corresponding to the enrichment process is set through the setting of the target air-fuel ratio AFTr used during the execution of the enrichment process.

After the target air-fuel ratio AFTr is set, the process proceeds to the next step denoted by S142. In step S142, it is determined whether or not the condition for ending the enrichment process is satisfied. The length of the execution period of the enrichment process set in advance is referred to as completion determination time. When the duration of the enrichment process after the combustion of the air-fuel mixture is resumed in the cylinder 11 is less than the completion determination time, it is determined that the end condition is not satisfied. When the duration of the enrichment process is greater than or equal to the completion determination time, it is determined that the end condition is satisfied.

When it is determined that the end condition is not satisfied (S142: NO), the process proceeds to the next step denoted by S144. In step S144, the request value QPR of the fuel injection amount is calculated so that the air-fuel ratio detection value AFS becomes the target air-fuel ratio AFTr set in step S141. In step S145, the driving of the fuel injection valve 17 is controlled based on the calculated request value QPR. As a result, the fuel injection valve 17 injects a greater amount of fuel than when the target air-fuel ratio AFTr is the stoichiometric air-fuel ratio, and the enrichment process is executed. In this case, as the target air-fuel ratio AFTr set in step S141 becomes closer to the stoichiometric air-fuel ratio, the fuel injection amount of the fuel injection valve 17 decreases. Then, the process proceeds to step S142 described above. That is, the enrichment process is continued until it is determined that the condition for ending the enrichment process is satisfied.

When it is determined that the condition for ending the enrichment process is satisfied (step S142: YES), the series of processes is ended. That is, the enrichment process is ended. After the target air-fuel ratio AFTr is set to the stoichiometric air-fuel ratio, the driving of the fuel injection valve 17 is controlled.

Next, the operation and effects of the second embodiment will be described with reference to FIG. 9.

Figure 9:
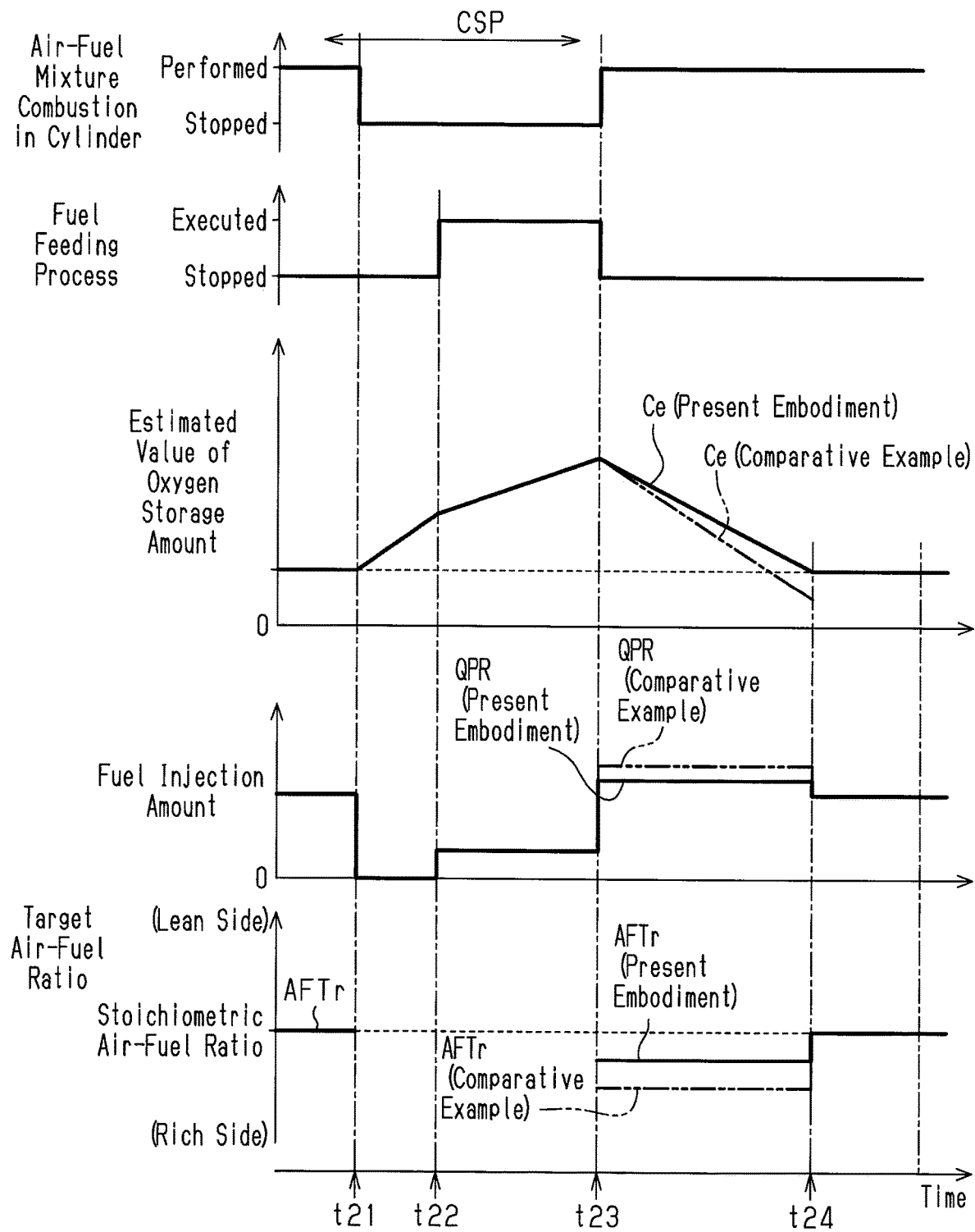
FIG. 9 is a time chart according to the second embodiment when the combustion stoppage period is ended and the combustion of the air-fuel mixture is resumed in the cylinder.

As shown in FIG. 9, before time t21, fuel is injected from the fuel injection valve 17 with the target air-fuel ratio AFTr set to the stoichiometric air-fuel ratio, and the air-fuel mixture containing the fuel is burned in the cylinder 11. At time t21, when the condition for stopping combustion of the air-fuel mixture in the cylinder 11 is satisfied, the combustion stoppage period CSP starts. Since the estimated value of the captured amount of particulate matter in the particulate filter 23 calculated at time t21 is less than the capture determination amount, the condition for executing the fuel feeding process is not satisfied. Thus, the fuel cut process is performed from time t21. When the estimated value of the captured amount of particulate matter in the particulate filter 23 calculated at time t22 during the combustion stoppage period CSP is greater than or equal to the capture determination amount, the condition for executing the fuel feeding process is satisfied. More specifically, at time t22, the process changes from the fuel cut process to the fuel feeding process.

At time t23, the condition for stopping the combustion of the air-fuel mixture in the cylinder 11 is not satisfied, and the combustion of the air-fuel mixture is resumed in the cylinder 11. The target air-fuel ratio AFTr used during execution of the enrichment process is set based on the estimated value Ce of the oxygen storage amount obtained at time t23. The enrichment process is performed from time t23 to time t24. That is, the period from time t23 to time t24 corresponds to the execution period of the enrichment process set in advance.

In the time chart showing changes in the target air-fuel ratio AFTr, the double-dashed line shows a comparative example in which the target air-fuel ratio AFTr is maintained at a predetermined value without using the estimated value Ce of the oxygen storage amount of the three-way catalyst 22 at the point in time when the combustion of the air-fuel mixture is resumed in the cylinder 11. More specifically, in the comparative example, the target air-fuel ratio AFTr is not changed in accordance with the estimated value Ce of the oxygen storage amount. Additionally, in the time chart showing changes in the estimated value Ce of the oxygen storage amount, the double-dashed line shows changes in the oxygen storage amount in the comparative example. In the time chart showing changes in the request value QPR of the fuel injection amount, the double-dashed line shows changes in the request value QPR in the case of the comparative example. In the comparative example, the target air-fuel ratio AFTr used during the execution of the enrichment process is set without using the estimated value Ce obtained at time t23. The target air-fuel ratio AFTr in the comparative example is richer than the target air-fuel ratio AFTr in the second embodiment. Thus, when the request value QPR of the fuel injection amount is calculated based on the target air-fuel ratio AFTr of the comparative example, the fuel injection amount of the fuel injection valve 17 increases. As a result, the execution of the enrichment process significantly decreases the oxygen storage amount of the three-way catalyst 22 from the specified amount CTh.

In this regard, in the second embodiment, the target air-fuel ratio AFTr used during the execution of the enrichment process is set based on the estimated value Ce obtained at time t23. More specifically, as the estimated value Ce at time t23 decreases, the target air-fuel ratio AFTr is set to a value closer to the stoichiometric air-fuel ratio. As the estimated value Ce at time t23 decreases, the decrease rate of the oxygen storage amount of the three-way catalyst 22 decreases during the execution period of the enrichment process. Thus, when the enrichment process is executed, the oxygen storage amount is set to a value close to the specified amount CTh regardless of the oxygen storage amount of the three-way catalyst 22 at a time of resuming combustion of the air-fuel mixture in the cylinder 11.

Third Embodiment

Next, a third embodiment of a controller for an internal combustion engine will be described with reference to FIG. 10. The third embodiment is different from the first and second embodiments in that the decrease amount of the oxygen storage amount corresponding to the enrichment process is set without using the estimated value Ce of the oxygen storage amount of the three-way catalyst 22 at the point in time when the combustion of the air-fuel mixture is resumed in the cylinder 11. Therefore, in the following description, parts different from the first and second embodiments will be mainly described, and the same reference characters are given to the same or corresponding components as the first and second embodiments to omit redundant description.

In the third embodiment, the enrichment process includes the first enrichment process and the second enrichment process. The injection valve control unit 111 selectively executes one of the first enrichment process and the second enrichment process at a time of resuming combustion of the air-fuel mixture in the cylinder 11. The second enrichment process is a process in which the decrease amount of the oxygen storage amount of the three-way catalyst 22 becomes smaller than that at the time of execution of the first enrichment process. For example, the target air-fuel ratio AFTr used during the execution of the second enrichment process is the same as the target air-fuel ratio AFTr used during the execution of the first enrichment process, and the execution period of the second enrichment process is shorter than the execution period of the first enrichment process.

A flow of processes executed by the injection valve control unit 111 to execute the enrichment process at a time of resuming combustion of the air-fuel mixture in the cylinder 11 will be described with reference to FIG. 10. A series of processes shown in FIG. 10 is executed when the combustion of the air-fuel mixture is resumed in the cylinder 11.

Figure 10:
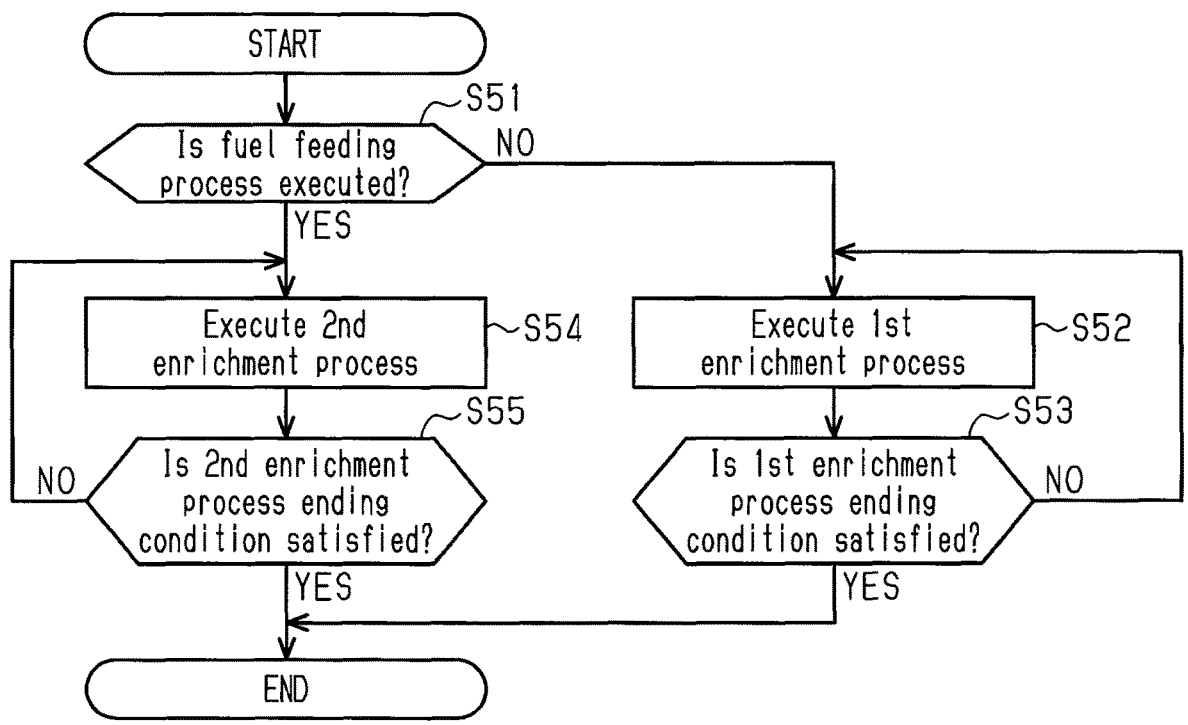
FIG. 10 is a flowchart showing a procedure when executing the enrichment process when combustion of air-fuel mixture is resumed in the cylinder according to a third embodiment.

In the series of processes shown in FIG. 10, in the first step S51, it is determined whether or not the fuel feeding process is executed during the combustion stoppage period CSP. It may be assumed that when the fuel feeding process is executed during the combustion stoppage period CSP, the oxygen storage amount of the three-way catalyst 22 at the point in time when the combustion of the air-fuel mixture is resumed in the cylinder 11 is less than when the fuel feeding process is not executed during the combustion stoppage period CSP. When it is determined that the fuel feeding process is not executed during the combustion stoppage period CSP (S51: NO), it may be assumed that the oxygen storage amount of the three-way catalyst 22 is large, and thus the process proceeds to the next step denoted by S52.

In step S52, the first enrichment process is performed. Subsequently, in step S53, it is determined whether or not the condition for ending the first enrichment process is satisfied. The length of the execution period of the first enrichment process is referred to as a first determination execution time. When the duration of the first enrichment process is less than the first determination execution time, it is determined that the end condition is not satisfied. When the duration of the first enrichment process is greater than or equal to the first determination execution time, it is determined that the end condition is satisfied.

When it is determined that the condition for ending the first enrichment process is not satisfied (S53: NO), the process proceeds to step S52 described above. That is, the first enrichment process is continued. When it is determined that the condition for ending the first enrichment process is satisfied (S53: YES), the series of processes is ended. That is, the first enrichment process is ended. After the target air-fuel ratio AFTr is set to the stoichiometric air-fuel ratio, the driving of the fuel injection valve 17 is controlled.

When it is determined that the fuel feeding process is executed during the combustion stoppage period CSP (step S51: YES), it may be assumed that the oxygen storage amount of the three-way catalyst 22 is not increased so much, and the process proceeds to the next step denoted by S54.

In step S54, the second enrichment process is performed. Subsequently, in step S55, it is determined whether or not the condition for ending the second enrichment process is satisfied. The length of the execution period of the second enrichment process is referred to as a second determination execution time. When the duration of the second enrichment process is less than the second determination execution time, it is determined that the end condition is not satisfied. When the duration of the second enrichment process is greater than or equal to the second determination execution time, it is determined that the end condition is satisfied. The second determination execution time is less than the first determination execution time.

When it is determined that the condition for ending the second enrichment process is not satisfied (S55: NO), the process proceeds to step S54 described above. That is, the second enrichment process is continued. When it is determined that the condition for ending the second enrichment process is satisfied (S55: YES), the series of processes is ended. That is, the second enrichment process is ended. After the target air-fuel ratio AFTr is set to the stoichiometric air-fuel ratio, the driving of the fuel injection valve 17 is controlled.

In the third embodiment, when the enrichment process is executed, the decrease amount of the oxygen storage amount of the three-way catalyst 22 corresponding to the enrichment process is set depending on whether or not the fuel feeding process is executed during the combustion stoppage period CSP. More specifically, when the fuel feeding process is not executed during the combustion stoppage period CSP, it may be assumed that the oxygen storage amount of the three-way catalyst 22 at the point in time when the combustion of the air-fuel mixture is resumed in the cylinder 11 is greater than when the fuel feeding process is executed during the combustion stoppage period CSP. Thus, the first enrichment process is executed. When the fuel feeding process is executed during the combustion stoppage period CSP, it may be assumed that the oxygen storage amount of the three-way catalyst 22 at the point in time when the combustion of the air-fuel mixture is resumed in the cylinder 11 less than when the fuel feeding process is not executed during the combustion stoppage period CSP. Thus, in this case, the second enrichment process, which has a shorter execution period than the first enrichment process, is performed. As a result, when resuming the combustion of the air-fuel mixture in the cylinder 11, the enrichment process is executed in accordance with the oxygen storage amount of the three-way catalyst 22 at the time of resuming the combustion. Thus, the execution of the enrichment process prevents the oxygen storage amount of the three-way catalyst 22 from significantly decreasing from the specified amount CTh.

Modified Examples

Each of the above embodiments can be modified and implemented as below. Each of the above embodiments and the following modified examples can be implemented by being combined with each other within a scope not technically conflicting each other.

In the first and second embodiments, when the estimated value Ce of the oxygen storage amount is small at the point in time when the combustion of the air-fuel mixture is resumed in the cylinder 11, the enrichment process may be executed so that the execution period of the enrichment process is shorter than when the estimated value Ce is large, and so that the target air-fuel ratio AFTr is set to a value closer to the stoichiometric air-fuel ratio than when the estimated value Ce is large.

In the third embodiment, the length of the execution period of the second enrichment process may be set to be the same as the length of the execution period of the first enrichment process, and the target air-fuel ratio AFTr at the time of the execution of the second enrichment process may be set to a value closer to the stoichiometric air-fuel ratio than the target air-fuel ratio AFTr at the time of the execution of the first enrichment process.

In the third embodiment, the second enrichment process may be a process in which the execution period is shorter than the execution period of the first enrichment process, and the target air-fuel ratio AFTr is set to a value closer to the stoichiometric air-fuel ratio than that used during the execution of the first enrichment process.

Figure 11:
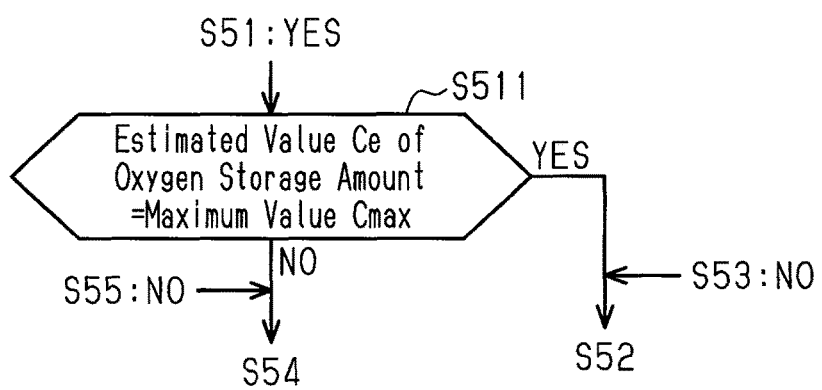
FIG. 11 is a flowchart showing a part of a procedure when executing the enrichment process when combustion of air-fuel mixture is resumed in the cylinder according to a modified example.

In the third embodiment, as shown in FIG. 11, even when the fuel feeding process is executed during the combustion stoppage period CSP (S51: YES), if it is determined that the oxygen storage amount of the three-way catalyst 22 at the point in time when the combustion of the air-fuel mixture is resumed in the cylinder 11 has reached the maximum value Cmax (S511: YES), the first enrichment process may be executed instead of the second enrichment process. The determination that the oxygen storage amount of the three-way catalyst 22 has reached the maximum value Cmax can be made based on, for example, the execution period of the fuel feeding process being sufficiently long. When the estimated value Ce of the oxygen storage amount calculated through the series of processes shown in FIG. 3 has reached the maximum value Cmax, it may be determined that the oxygen storage amount of the three-way catalyst 22 at the point in time when the combustion is resumed has reached the maximum value Cmax.

During the execution of the enrichment process, the decrease rate of the oxygen storage amount of the three-way catalyst 22 increases as the fuel injection amount of the fuel injection valve 17 increases. More specifically, the decrease amount of the oxygen storage amount corresponding to the enrichment process may be assumed based on the accumulated value of the fuel injection amount during the execution of the enrichment process. Therefore, in step S41 of the first embodiment and step S141 of the second embodiment, a determination accumulated value, which is a determination value of the accumulated value of the fuel injection amount, may be set. For example, the determination accumulated value is set to a value that increases as the estimated value Ce of the oxygen storage amount of the three-way catalyst 22 increases at the point in time when the combustion of the air-fuel mixture is resumed in the cylinder 11. Then, the execution of the enrichment process may be ended when the accumulated value of the fuel injection amount during the execution of the enrichment process is greater than or equal to the determination accumulated value. Thus, through the setting of the determination accumulated value, the decrease amount of the oxygen storage amount corresponding to the enrichment process is set.

A flow rate sensor may be provided in a portion of the exhaust passage 21 at the upstream side of the three-way catalyst 22 to detect the flow rate of gas, and the unit increase amount ΔCe may be calculated based on the gas flow rate of the exhaust passage detected by the flow rate sensor.

In the above embodiments, the ignition device 19 is not allowed to perform spark discharge during the execution of the fuel feeding process. However, during the execution of the fuel feeding process, the ignition device 19 may perform the spark discharge at a time when the air-fuel mixture is not burned in the cylinder 11. For example, when the piston 12 is located near the bottom dead center and the spark discharge is performed, the air-fuel mixture is not burned in the cylinder 11 in which the spark discharge is performed. Thus, during the execution of the fuel feeding process, even when spark discharge is performed, the fuel injected from the fuel injection valve 17 may be discharged from the cylinder 11 into the exhaust passage 21 in an unburned state.

The controller for an internal combustion engine may be applied to an internal combustion engine that includes a direct injection valve, which is a fuel injection valve that directly injects fuel into the cylinder 11. In this case, during the execution of the fuel feeding process, fuel is injected from the direct injection valve into the cylinder 11, and the fuel is discharged into the exhaust passage 21 in an unburned state. Thus, unburned fuel is drawn into the three-way catalyst 22.

The system of a hybrid vehicle may be configured to control the rotational speed of the crankshaft 14 by the driving of a motor and may differ from the system shown in FIG. 1.

The controller for an internal combustion engine may be embodied in a device for controlling an internal combustion engine mounted on a vehicle that does not have a power source other than the internal combustion engine. Even in an internal combustion engine mounted on such a vehicle, the combustion of the air-fuel mixture in the cylinder may be stopped under a situation in which the crankshaft 14 is rotating with inertia. When the execution condition of the fuel feeding process is satisfied during the combustion stoppage period CSP, the fuel feeding process is executed, and the temperature of the three-way catalyst 22 increases.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. A controller for an internal combustion engine of a spark ignition type, wherein:
   the internal combustion engine includes a fuel injection valve configured to inject fuel and a three-way catalyst provided in an exhaust passage; and
   the internal combustion engine is configured to burn an air-fuel mixture containing fuel injected from the fuel injection valve in a cylinder, the controller comprising circuitry, wherein the circuitry is configured to perform
   selectively executing one of a fuel cut process and a fuel feeding process when stopping combustion in the cylinder in a situation in which a crankshaft of the internal combustion engine is rotating, the fuel cut process including stopping fuel injection of the fuel injection valve, and the fuel feeding process including injecting fuel from the fuel injection valve and discharging the fuel in an unburned state from the cylinder to the exhaust passage,
   executing an enrichment process that controls the fuel injection valve when combustion is resumed in the cylinder in which the combustion has been stopped, so that an air-fuel ratio is set to be richer than a stoichiometric air-fuel ratio, and
   setting a decrease amount of an oxygen storage amount of the three-way catalyst corresponding to the enrichment process when executing the enrichment process.

2. The controller according to claim 1, wherein when resuming combustion in the cylinder in which the combustion has been stopped, the circuitry is configured to execute the enrichment process so that in a case in which the fuel feeding process is executed in a period during which combustion is stopped in the cylinder, the decrease amount of the oxygen storage amount of the three-way catalyst is less than in a case in which the fuel feeding process is not executed in the period during which combustion is stopped in the cylinder.

3. The controller according to claim 2, wherein
the circuitry is further configured to calculate an estimated value of an oxygen storage amount of the three-way catalyst,
the circuitry is configured to calculate the estimated value of the oxygen storage amount so that during execution of the fuel feeding process, an increase rate of the oxygen storage amount of the three-way catalyst is lower than during execution of the fuel cut process,
the enrichment process includes a first enrichment process and a second enrichment process, wherein when the second enrichment process is executed, the decrease amount of the oxygen storage amount of the three-way catalyst is less than when the first enrichment process is executed,
the circuitry is configured to selectively execute one of the first enrichment process and the second enrichment process, and
the circuitry is configured to
execute the second enrichment process when combustion is resumed in the cylinder and the estimated value of the oxygen storage amount at a point in time when the combustion is resumed in the cylinder is less than a maximum value of the oxygen storage amount of the three-way catalyst, and
execute the first enrichment process when combustion is resumed in the cylinder and the estimated value of the oxygen storage amount at a point in time when the combustion is resumed in the cylinder is the maximum value of the oxygen storage amount of the three-way catalyst.

4. The controller according to claim 3, wherein the circuitry is configured to
calculate the estimated value of the oxygen storage amount during execution of the fuel cut process so that the increase rate of the oxygen storage amount of the three-way catalyst becomes higher as a flow rate of gas in the exhaust passage increases, and
calculate the estimated value of the oxygen storage amount during execution of the fuel feeding process so that the increase rate of the oxygen storage amount of the three-way catalyst becomes higher as the flow rate of gas in the exhaust passage increases and so that the increase rate becomes lower as a fuel injection amount of the fuel injection valve increases.

5. The controller according to claim 1, wherein
the circuitry is further configured to calculate an estimated value of the oxygen storage amount of the three-way catalyst,
the circuitry is configured to calculate the estimated value of the oxygen storage amount so that during execution of the fuel feeding process, an increase rate of the oxygen storage amount of the three-way catalyst is lower than during execution of the fuel cut process, and
the circuitry is configured to execute the enrichment process when resuming combustion in the cylinder, so that in a case in which the estimated value of the oxygen storage amount at a point in time when the combustion is resumed in the cylinder is small, the decrease amount of the oxygen storage amount of the three-way catalyst is less than in a case in which the estimated value of the oxygen storage amount at a point in time when the combustion is resumed is large.

6. The controller according to claim 5, wherein the circuitry is configured to
calculate the estimated value of the oxygen storage amount during execution of the fuel cut process so that the increase rate of the oxygen storage amount of the three-way catalyst becomes higher as a flow rate of gas in the exhaust passage increases, and
calculate the estimated value of the oxygen storage amount during execution of the fuel feeding process so that the increase rate of the oxygen storage amount of the three-way catalyst becomes higher as the flow rate of gas in the exhaust passage increases and so that the increase rate becomes lower as a fuel injection amount of the fuel injection valve increases.

7. The controller according to claim 1, wherein the circuitry is configured to set the decrease amount of the oxygen storage amount of the three-way catalyst in the enrichment process through setting of a length of an execution period of the enrichment process.

8. The controller according to claim 1, wherein the circuitry is configured to set the decrease amount of the oxygen storage amount of the three-way catalyst in the enrichment process through setting of the air-fuel ratio during execution of the enrichment process.

9. A controller for an internal combustion engine of a spark ignition type, wherein the internal combustion engine includes a fuel injection valve configured to inject fuel and a three-way catalyst provided in an exhaust passage, and the internal combustion engine is configured to burn an air-fuel mixture containing fuel injected from the fuel injection valve in a cylinder,
the controller comprising circuitry, wherein the circuitry is configured to perform
selectively executing one of a fuel cut process and a fuel feeding process when stopping combustion in the cylinder in a situation in which a crankshaft of the internal combustion engine is rotating, the fuel cut process including stopping fuel injection of the fuel injection valve, and the fuel feeding process including injecting fuel from the fuel injection valve and discharging the fuel in an unburned state from the cylinder to the exhaust passage,
executing an enrichment process that controls the fuel injection valve when combustion is resumed in the cylinder in which the combustion has been stopped, so that an air-fuel ratio is set to be richer than a stoichiometric air-fuel ratio, and
executing the enrichment process when resuming combustion in the cylinder in which the combustion has been stopped, so that in a case in which the fuel feeding process is executed in a period during which combustion is stopped in the cylinder, a decrease amount of an oxygen storage amount of the three-way catalyst is less than in a case in which the fuel feeding process is not executed in the period during which combustion is stopped in the cylinder.

10. The controller according to claim 9, wherein
the circuitry is further configured to calculate an estimated value of the oxygen storage amount of the three-way catalyst, the circuitry is configured to calculate the estimated value of the oxygen storage amount so that during execution of the fuel feeding process, an increase rate of the oxygen storage amount of the three-way catalyst is lower than during execution of the fuel cut process, the enrichment process includes a first enrichment process and a second enrichment process, wherein when the second enrichment process is executed, the decrease amount of the oxygen storage amount of the three-way catalyst is less than when the first enrichment process is executed, the circuitry is configured to selectively execute one of the first enrichment process and the second enrichment process, and the circuitry is configured to
- execute the second enrichment process when combustion is resumed in the cylinder and the estimated value of the oxygen storage amount at a point in time when the combustion is resumed in the cylinder is less than a maximum value of the oxygen storage amount of the three-way catalyst, and
- execute the first enrichment process when combustion is resumed in the cylinder and the estimated value of the oxygen storage amount at a point in time when the combustion is resumed in the cylinder is the maximum value of the oxygen storage amount of the three-way catalyst.

11. The controller according to claim 10, wherein the circuitry is configured to
- calculate the estimated value of the oxygen storage amount during execution of the fuel cut process so that the increase rate of the oxygen storage amount of the three-way catalyst becomes higher as a flow rate of gas in the exhaust passage increases, and
- calculate the estimated value of the oxygen storage amount during execution of the fuel feeding process so that the increase rate of the oxygen storage amount of the three-way catalyst becomes higher as the flow rate of gas in the exhaust passage increases and so that the increase rate becomes lower as a fuel injection amount of the fuel injection valve increases.

12. The controller according to claim 9, wherein the circuitry is configured to set the decrease amount of the oxygen storage amount of the three-way catalyst in the enrichment process through setting of a length of an execution period of the enrichment process.

13. The controller according to claim 9, wherein the circuitry is configured to set the decrease amount of the oxygen storage amount of the three-way catalyst in the enrichment process through setting of the air-fuel ratio during execution of the enrichment process.

14. A method for controlling an internal combustion engine of a spark ignition type, wherein the internal combustion engine includes a fuel injection valve configured to inject fuel and a three-way catalyst provided in an exhaust passage, and the internal combustion engine is configured to burn an air-fuel mixture containing fuel injected from the fuel injection valve in a cylinder, the method comprising:
- selectively executing one of a fuel cut process and a fuel feeding process when stopping combustion in the cylinder in a situation in which a crankshaft of the internal combustion engine is rotating, the fuel cut process including stopping fuel injection of the fuel injection valve, and the fuel feeding process including injecting fuel from the fuel injection valve and discharging the fuel in an unburned state from the cylinder to the exhaust passage;
- executing an enrichment process that controls the fuel injection valve when combustion is resumed in the cylinder in which the combustion has been stopped, so that an air-fuel ratio is set to be richer than a stoichiometric air-fuel ratio; and
- setting a decrease amount of an oxygen storage amount of the three-way catalyst corresponding to the enrichment process when executing the enrichment process.

* * * * *